United States Patent
Amano et al.

(10) Patent No.: US 11,450,911 B2
(45) Date of Patent: Sep. 20, 2022

(54) BATTERY PACKAGING MATERIAL, METHOD FOR MANUFACTURING THE SAME, AND BATTERY

(71) Applicant: DAI NIPPON PRINTING CO., LTD., Tokyo (JP)

(72) Inventors: Makoto Amano, Tokyo (JP); Takanori Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 188 days.

(21) Appl. No.: 16/968,446

(22) PCT Filed: Feb. 6, 2019

(86) PCT No.: PCT/JP2019/004209
§ 371 (c)(1),
(2) Date: Aug. 7, 2020

(87) PCT Pub. No.: WO2019/156113
PCT Pub. Date: Aug. 15, 2019

(65) Prior Publication Data
US 2020/0403194 A1 Dec. 24, 2020

(30) Foreign Application Priority Data

Feb. 7, 2018 (JP) .............................. JP2018-020407
Oct. 24, 2018 (JP) .............................. JP2018-200443

(51) Int. Cl.
*H01M 50/124* (2021.01)
*H01M 50/116* (2021.01)
(Continued)

(52) U.S. Cl.
CPC ........... *H01M 50/124* (2021.01); *B32B 15/09* (2013.01); *B32B 15/20* (2013.01); *H01M 50/116* (2021.01);
(Continued)

(58) Field of Classification Search
CPC ............. H01M 50/124; H01M 50/116; H01M 50/543; H01M 50/172; B32B 15/09;
(Continued)

(56) References Cited

U.S. PATENT DOCUMENTS

2008/0286635 A1   11/2008   Seino et al.

FOREIGN PATENT DOCUMENTS

EP    2 645 449 A1   10/2013
JP    2003-051290 A   2/2003
(Continued)

OTHER PUBLICATIONS

WO2016159278 Yasdua et al. translation.*
(Continued)

*Primary Examiner* — Jane J Rhee
(74) *Attorney, Agent, or Firm* — Oliff PLC

(57) ABSTRACT

A battery packaging material is configured from a laminate including, at a minimum, a polyester film layer, an aluminum alloy foil layer, and a heat fusible resin layer in the stated order. The thickness of the polyester film layer is 23-27 μm (inclusive), the thickness of the aluminum alloy foil layer is 27-43 μm (inclusive), the thickness of the heat fusible resin layer is 70-100 μm (inclusive), and the insulation breakdown voltage of the surface of the polyester film layer side is 13 kV or greater.

18 Claims, 7 Drawing Sheets

(51) Int. Cl.
    *H01M 50/543* (2021.01)
    *H01M 50/172* (2021.01)
    *B32B 15/09* (2006.01)
    *B32B 15/20* (2006.01)

(52) U.S. Cl.
    CPC ....... *H01M 50/172* (2021.01); *H01M 50/543* (2021.01); *B32B 2250/03* (2013.01); *B32B 2307/732* (2013.01); *B32B 2457/10* (2013.01)

(58) Field of Classification Search
    CPC ................ B32B 15/20; B32B 2250/03; B32B 2307/732; B32B 2457/10
    See application file for complete search history.

(56) References Cited

FOREIGN PATENT DOCUMENTS

| | | |
|---|---|---|
| JP | 2008-287971 A | 11/2008 |
| JP | 2010-036350 A | 2/2010 |
| JP | 2012-033393 A | 2/2012 |
| JP | 2013-201027 A | 10/2013 |
| JP | 2017-188227 A | 10/2017 |
| WO | 2016/159278 A1 | 10/2016 |

OTHER PUBLICATIONS

JP200351290 Yamashita et al. translation.*
Apr. 23, 2019 Search Report issued in International Patent Application No. PCT/JP2019/004209.

* cited by examiner

BATTERY PACKAGING MATERIAL, METHOD FOR MANUFACTURING THE SAME, AND BATTERY

TECHNICAL FIELD

The present invention relates to a battery packaging material, a method for manufacturing the same, and a battery.

BACKGROUND ART

Various types of batteries have been developed heretofore. In every battery, a packaging material is an essential member to seal battery elements such as an electrode and an electrolyte. Metallic packaging materials have often been adopted heretofore as battery packaging material.

Meanwhile, in recent years, batteries have been required to be diversified in shape and to be thinner and lighter in response to improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, a film-shaped laminate in which at least a base substrate layer, an aluminum alloy foil layer, and a heat-sealable resin layer are laminated in this order has been proposed as a battery packaging material which is easily processed into diverse shapes and which can be thinner and lighter (see, for example, Patent Document 1).

In such a battery packaging material, generally, a concave portion is formed by cold molding, battery elements such as an electrode and an electrolyte are arranged in a space formed by the concave portion, and heat-sealable resin layers are thermally welded to obtain a battery with battery elements stored in the battery packaging material.

Film-shaped battery packaging materials have been heretofore mainly adopted for small electric appliances such as mobile phones, smartphones, laptops, and tablets. However, in recent years, the film-shaped battery packaging materials tend to be also used for electric bicycles, automobiles, power storage devices, and the like. Also, there is a tendency that a plurality of batteries are modularized (a plurality of batteries are stacked) and used in accordance with increases in size and capacity of a battery for which the battery packaging material is adopted (see, for example, Patent Document 2).

A polyamide film is widely adopted as a base substrate layer for a battery packaging material. However, since the polyamide film has low insulating properties, when the base substrate layer is formed from the polyamide film, the insulating properties of a modularized high-capacity battery usable in an automobile or the like may be deteriorated. For example, if the insulating properties are deteriorated and discharge occurs in a part of the modularized batteries, another adjacent battery may be destroyed and the battery function may be impaired. In particular, although batteries for automobiles and the like are required to have durability in a harsh environment, the polyamide film has a problem that its insulating properties are more likely to decrease in a high humidity environment.

PRIOR ART DOCUMENTS

Patent Documents

Patent Document 1: JP 2008-287971 A
Patent Document 2: JP 2013-201027 A

For example, as shown in FIGS. 1 to 4, a battery 20 using a film-shaped battery packaging material 10 is provided with an adhesive film 12 between a metal terminal 11 that is electrically connected to an electrode of a battery element 40 and the battery packaging material 10 that seals the battery element 40. In FIGS. 1 to 4, a description of each layer included in the battery packaging material 10 is omitted. The adhesive film 12 is interposed between the metal terminal 11 electrically connected to the electrode of the battery element 40 and the battery packaging material 10 sealing the battery element 40. The metal terminal 11 protrudes to the outside of the battery packaging material 10, and is held by the battery packaging material 10 with the adhesive film 12 interposed therebetween at a peripheral edge portion 10a that is a heat-sealed part of the battery packaging material 10.

The metal terminal 11 having a large thickness is adopted in a battery requiring a large capacity output, such as a vehicle battery. Thus, when the battery element 40 is sealed with the battery packaging material 10, the thickness at a portion where the metal terminal 11 and the adhesive film 12 are located (hereinafter, this portion is referred to as a metal terminal extraction seal portion) is increased compared with the surrounding seal portion by the total thickness of the thickness of the metal terminal 11 and the thickness of the adhesive film 12 or the thickness of the adhesive film 12. Thus, in the metal terminal extraction seal portion, while the battery packaging material 10 significantly changes its shape along the shape of the metal terminal 11, the heat-sealable resin layer is melted to fill a gap between the heat-sealable resin layer and the adhesive film 12, so that mutual thermal welding is carried out. On the other hand, the heat-sealable resin layers are thermally welded to each other around the metal terminal extraction seal portion (see FIG. 4). Thus, in the metal terminal extraction seal portion, if the amount of the heat-sealable resin layer to be melted at the time of heat sealing is insufficient, a gap between the heat-sealable resin layer and the adhesive film 12 cannot be filled with a heat-sealable resin and an electrolyte may leak from the inside of the battery 20. In particular, when the battery is placed in a high-temperature and high-humidity environment, the risk of the electrolyte leaking out between the heat-sealable resin layer and the adhesive film 12 increases. These points will be described more specifically with reference to the schematic diagram of FIG. 4.

FIG. 4 is an enlarged view of a portion of the schematic sectional view of FIG. 3 where the metal terminal 11 and the adhesive film 12 are located. As shown in FIG. 4, the heat-sealable resin layer and the adhesive film 12 are welded to each other in the metal terminal extraction seal portion. On the other hand, in the seal portion (an interface portion 4a between the heat-sealable resin layers) around the metal terminal extraction seal portion, the heat-sealable resin layers are thermally welded to each other. By these thermal welding operations, the battery element 40 is sealed with the battery packaging material 10. In the battery requiring a large capacity output, such as a vehicle battery, the metal terminal 11 having a large thickness Wa is adopted, and in order to improve the adhesiveness between the metal terminal 11 and the battery packaging material 10, the adhesive film 12 may be interposed between the metal terminal 11 and the battery packaging material 10. In this case, when the battery element 40 is sealed with the battery packaging material 10, the thickness at the metal terminal extraction seal portion is increased compared with the surrounding seal portion (the interface portion 4a between the heat-sealable resin layers) by the total thickness of the thickness of the metal terminal 11 and the thickness of the adhesive film 12 or the thickness of the adhesive film 12. Thus, in the metal terminal extraction seal portion, while the battery packaging material 10 significantly changes its shape along the shape of the metal terminal 11, the heat-sealable resin is melted to fill the gap between the heat-sealable resin layer and the adhesive film 12, so that thermal welding is carried out. On the other hand, the heat-sealable resin layers are thermally welded to each other around the metal terminal extraction seal portion. At this time, in a portion indicated by a circle in FIG. 4, since the shape change of the heat-sealable resin layer is particularly large, if the amount of the heat-sealable resin layer to be melted at the time of heat sealing is insufficient, the gap between the heat-sealable resin layer and the adhesive film 12 cannot be filled, and the electrolyte may leak from the inside of the battery. Even when the adhesive film 12 is not used, a gap is likely to be formed between the heat-sealable resin layer and the metal terminal 11, and the electrolyte may leak from the inside of the battery.

Further, the battery packaging material is apt to cause a problem of occurrence of curling (curvature of the battery packaging material). The occurrence of curling of the battery packaging material mainly depends on the layer configuration of the battery packaging material. For example, when the relationship between the thickness of each layer of the battery packaging material changes, the curl size and direction also change. In particular, in the layer configuration of the battery packaging material, when a base substrate layer and the heat-sealable resin layer are provided through the aluminum alloy foil, the relationship between the thickness of the base substrate layer and the thickness of the heat-sealable resin layer has a great influence on curling. When the thickness of the base substrate layer is large, for example, in a step of laminating with an aluminum alloy foil to manufacture the battery packaging material (for example, laminating by a dry lamination method and the subsequent aging step at about 40 to 80° C.), curling tends to occur on the base substrate layer side. After the heat-sealable resin layer is laminated on the laminate in which the base substrate layer and the aluminum alloy foil are laminated, as the thickness of the heat-sealable resin layer increases, the battery packaging material tends to be curled on the heat-sealable resin layer side viewed from the thickness direction of the battery packaging material 10 due to the heat-sealable resin being shrunk when it is cooled from a high temperature to a low temperature when the heat-sealable resin layer is formed (for example, when the heat-sealable resin layer is laminated on an aluminum alloy foil by extrusion molding, the heat-sealable resin is extruded at 200 to 330° C. and then cooled to form the heat-sealable resin layer). When the curling of the battery packaging material is large, cutting of the battery packaging material, the subsequent molding, storage of the battery element, thermal welding of the heat-sealable resin layer, and the like are hindered, and battery production efficiency may be reduced. In particular, since the battery packaging material adopted for a large battery such as a vehicle battery has a large size, the influence of curling on battery productivity is very large. The battery packaging material is generally manufactured as a long roll and is used by being cut into a predetermined size according to the size of the battery; however, it can be said that the fact that the battery packaging material is wound in a roll has little influence on curling.

The vehicle battery or the like is usually used as a module in which a plurality of batteries are arranged. Thus, the battery packaging material adopted for such a battery is also required to have high surface insulating properties.

Lithium-ion batteries have been adopted in mobile devices requiring currents of about several hundreds mA to several A. However, in vehicle batteries, for example, currents of several tens A to several hundreds A may be applied to a battery pack during charge. In the vehicle batteries, since the vehicle battery is used as a module in which a plurality of batteries are arranged, high insulating properties are required so that a defective battery does not affect a battery adjacent thereto.

Under such circumstances, a main object of the present invention is to provide a battery packaging material in which curling is suppressed, sufficient surface insulating properties can be imparted to the battery, and leakage of the electrolyte of the battery is more effectively suppressed.

Means for Solving the Problem

The inventors of the present invention conducted a diligent study to solve the aforementioned problem. As a result, it has been found that in the battery packaging material which is configured from a laminate in which at least, a polyester film layer, an aluminum alloy foil layer, and a heat-sealable resin layer are laminated in this order and in which a thickness of the polyester film layer is 23 µm or more and 27 µm or less, a thickness of the aluminum alloy foil layer is 27 µm or more and 43 µm or less, a thickness of the heat-sealable resin layer is 70 µm or more and 100 µm or less, and a dielectric breakdown voltage of a surface on a side of the polyester film layer is 13 kV or more, curling is suppressed, sufficient surface insulating properties can be imparted to a battery, and leakage of an electrolyte of the battery is more effectively suppressed. The present invention was completed as a result of further research conducted based on these findings.

In summary, the present invention provides aspects of invention as itemized below.

Item 1. A battery packaging material configured from a laminate in which, at least, a polyester film layer, an aluminum alloy foil layer, and a heat-sealable resin layer are laminated in this order, in which a thickness of the polyester film layer is 23 µm or more and 27 µm or less, a thickness of the aluminum alloy foil layer is 27 µm or more and 43 µm or less, a thickness of the heat-sealable resin layer is 70 µm or more and 100 µm or less, and a dielectric breakdown voltage of a surface on a side of the polyester film layer is 13 kV or more.

Item 2. The battery packaging material according to Item 1, in which a logarithmic decrement $\Delta E$ at 80° C. in rigid-body pendulum measurement of a surface on a side of the heat-sealable resin layer of the laminate is 0.04 or more.

Item 3. The battery packaging material according to Item 1 or 2, in which the polyester film layer is configured from a stretched polyethylene terephthalate film.

Item 4. The battery packaging material according to any one of Items 1 to 3, in which the heat-sealable resin layer is configured from a random polypropylene film.

Item 5. The battery packaging material according to any one of Items 1 to 4, in which the aluminum alloy foil layer is configured from an aluminum alloy having a composition defined in JIS H4160:1994 A8021H-O.

Item 6. The battery packaging material according to any one of Items 1 to 5, in which a temperature difference $T_1$ and a temperature difference $T_2$ are measured by the following method, and a value obtained by dividing the temperature difference $T_2$ by the temperature difference $T_1$ is 0.55 or more.

(Measurement of Temperature Difference $T_1$)

By differential scanning calorimetry, the temperature difference $T_1$ between an extrapolation melting onset temperature and an extrapolation melting termination temperature of a melting peak temperature of the heat-sealable resin layer is measured.

(Measurement of Temperature Difference $T_2$)

In an environment of a temperature of 85° C., the heat-sealable resin layer is allowed to stand for 72 hours in an electrolyte which is a solution in which a concentration of lithium hexafluorophosphate is 1 mol/l and a volume ratio of ethylene carbonate, diethyl carbonate and dimethyl carbonate is 1:1:1, and then dried. By differential scanning calorimetry, the temperature difference $T_2$ between the extrapolation melting onset temperature and the extrapolation melting termination temperature of the melting peak temperature of the heat-sealable resin layer after drying is measured.

Item 7. The battery packaging material according to any one of Items 1 to 6, in which the logarithmic decrement ΔE at 120° C. in the rigid-body pendulum measurement of a surface of the heat-sealable resin layer on a side of the aluminum alloy foil layer is 0.50 or less.

Item 8. The battery packaging material according to any one of Items 1 to 7, in which the battery packaging material is used for a vehicle battery.

Item 9. A battery including a battery element including at least a positive electrode, a negative electrode, and an electrolyte, the battery element being stored in a package formed of the battery packaging material according to any one of Items 1 to 8.

Item 10. A battery including a battery element including at least a positive electrode, a negative electrode, and an electrolyte, a package for sealing the battery element, and a metal terminal electrically connected to each of the positive electrode and the negative electrode and protruding to the outside of the package, in which the package is formed of the battery packaging material according to any one of Items 1 to 8, and an adhesive film is present between the metal terminal and the package.

Item 11. The battery according to Item 10, in which a thickness of the metal terminal is 100 μm or more.

Item 12. The battery according to Item 10 or 11, in which a thickness of the adhesive film is 70 μm or more.

Item 13. A method for manufacturing a battery packaging material including a step of laminating at least, a polyester film layer, an aluminum alloy foil layer, and a heat-sealable resin layer in this order to obtain a laminate, in which a thickness of the polyester film layer is 23 μm or more and 27 μm or less, a thickness of the aluminum alloy foil layer is 27 μm or more and 43 μm or less, a thickness of the heat-sealable resin layer is 70 μm or more and 100 μm or less, and a dielectric breakdown voltage of a surface on a side of the polyester film layer is 13 kV or more.

ADVANTAGES OF THE INVENTION

According to the present invention, it is possible to provide a battery packaging material in which curling is suppressed, sufficient surface insulating properties can be imparted to the battery, and leakage of the electrolyte of the battery is more effectively suppressed. Further, according to the present invention, a battery using the battery packaging material can be provided.

EMBODIMENTS OF THE INVENTION

The battery packaging material of the present invention is configured from a laminate in which, at least, a polyester film layer, an aluminum alloy foil layer, and a heat-sealable resin layer are laminated in this order, in which a thickness of the polyester film layer is 23 μm or more and 27 μm or less, a thickness of the aluminum alloy foil layer is 27 μm or more and 43 μm or less, a thickness of the heat-sealable resin layer is 70 μm or more and 100 μm or less, and a dielectric breakdown voltage of a surface on a side of the polyester film layer is 13 kV or more. Since the battery packaging material of the present invention has such a specific configuration, curling is suppressed, sufficient surface insulating properties can be imparted to the battery, and leakage of an electrolyte of the battery is more effectively suppressed. Hereinafter, the battery packaging material of the present invention will be described in detail.

In the present specification, any numerical range indicated by " . . . to . . . " is intended to mean " . . . or more" and " . . . or less". For example, the recitation "2 to 15 mm" is intended to mean 2 mm or more and 15 mm or less.

1. Laminated Structure and Physical Properties of Battery Packaging Material

Figure 5:
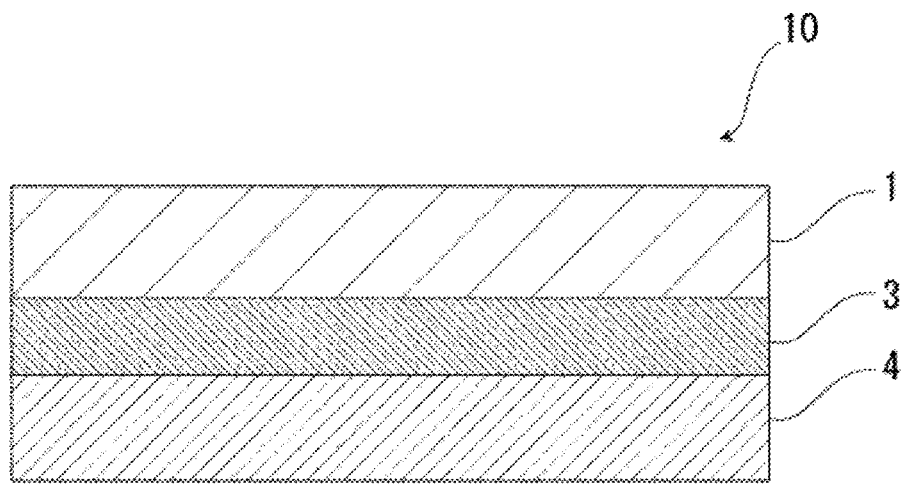
FIG. 5 is a diagram showing an example of a sectional structure of a battery packaging material of the present invention.
Figure 6:
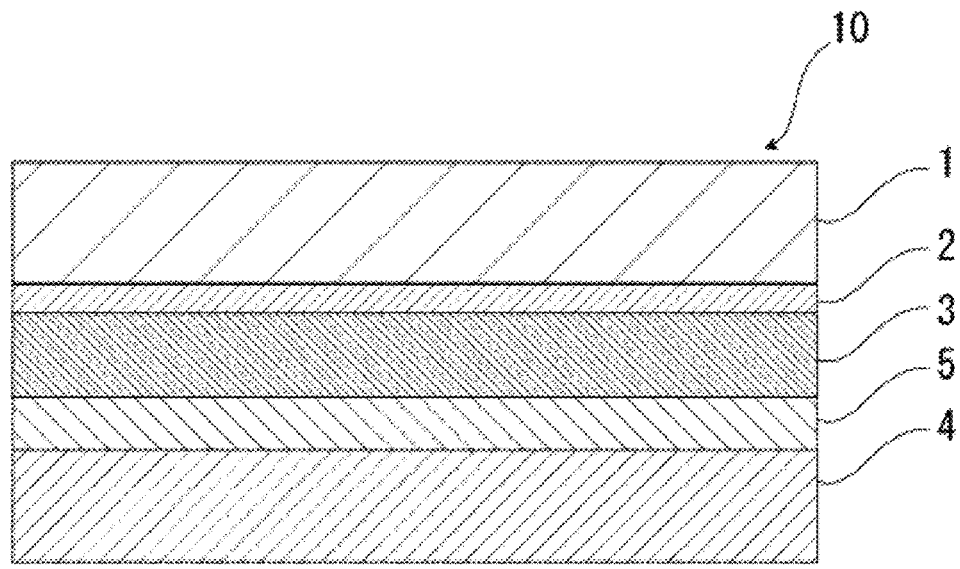
FIG. 6 is a diagram showing an example of the sectional structure of the battery packaging material of the present invention.
Figure 7:
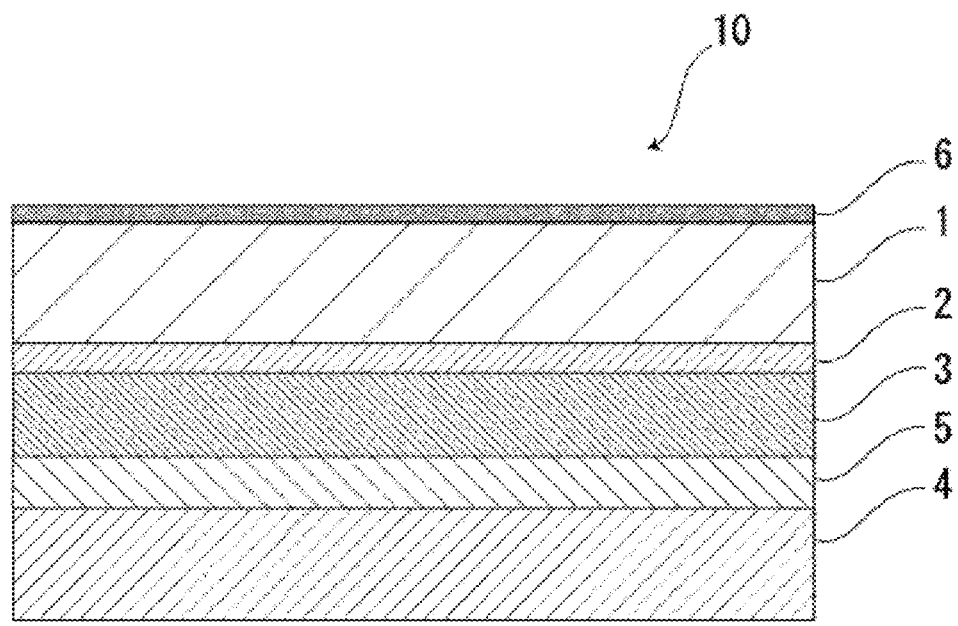
FIG. 7 is a diagram showing an example of the cross-sectional structure of the battery packaging material of the present invention.

The battery packaging material 10 of the present invention is configured from a laminate in which a polyester film layer 1, an aluminum alloy foil layer 3, and a heat-sealable resin layer 4 are laminated in this order, as shown in FIGS. 5 to 7, for example. In the battery packaging material of the present invention, the polyester film layer 1 is an outermost layer, and the heat-sealable resin layer 4 is an innermost layer. That is, during the assembly of a battery, a pair of the heat-sealable resin layers 4 positioned around the periphery of a battery element are thermally welded to each other to hermetically seal the battery element, such that the battery element is sealed.

In the battery packaging material of the present invention, as shown in FIGS. 6 and 7, for example, an adhesive agent layer 2 may be provided between the polyester film layer 1 and the aluminum alloy foil layer 3, and an adhesive layer 5 may be further provided between the aluminum alloy foil layer 3 and the heat-sealable resin layer 4. As shown in FIG. 7, a surface coating layer 6 may be optionally provided outside the polyester film layer 1 (on the side opposite to the heat-sealable resin layer 4).

The thickness of the laminate constituting the battery packaging material of the present invention is not particularly limited, and from the viewpoint of suppressing curling and having sufficient surface insulting properties while reducing the thickness of the laminate as much as possible, and more effectively suppressing the leakage of the electrolyte of the battery, the upper limit of the thickness of the laminate is preferably about 200 µm or less, more preferably about 180 µm or less, and still more preferably about 160 µm or less, and the lower limit is preferably about 120 µm or more, more preferably about 130 µm or more, and still more preferably about 140 µm or more. The preferred ranges include about 120 to 200 µm, about 120 to 180 µm, about 120 to 160 µm, about 130 to 200 µm, about 130 to 180 µm, about 130 to 160 µm, about 140 to 200 µm, about 140 to 180 µm, and about 140 to 160 µm.

From the viewpoint that the battery packaging material of the present invention exhibits sufficient surface insulating properties, the insulation breakdown voltage of a surface on the polyester film layer 1 side of the battery packaging material of the present invention may be 13 kV or more, preferably 14 kV or more, and more preferably 15 kV or more. The upper limit of the insulation breakdown voltage is, for example, 100 kV or less. In the present invention, the insulation breakdown voltage is a value measured in accordance with the conditions as defined in C2110-2:2016 with a test piece having a length of 100 mm and a width of 100 mm. Measurement is performed using a column-type electrode with diameter of 25 mm/column-type electrode with diameter of 25 mm. The insulation breakdown voltage is specifically a value measured by the method described in the examples.

The battery packaging material of the present invention preferably has a limit molding depth of about 6.0 mm or more when molded under the following conditions. The upper limit of the limit molding depth is, for example, about 10.0 mm.

<Molding Conditions>

Samples are prepared by cutting the battery packaging material into a rectangle having a width (TD: Transverse Direction) of 80 mm×a length (MD: Machine Direction) of 120 mm. In an environment of a temperature of 24° C. and relative humidity 50%, these samples are molded (draw-in one-step molding) by increasing a molding depth in 0.5 mm increments from a molding depth of 0.5 mm at a pressing pressure of 0.4 MPa, using a molding die (female mold, surface: a maximum height roughness (nominal value of Rz) of 3.2 µm that is specified in Table 2 of JIS B 0659-1: 2002, Annex 1 (reference), Standard Surface Roughness Piece for Comparison) having an opening size of 30 mm×50 mm and a corresponding molding die (male mold, surface: a maximum height roughness (nominal value of Rz) of 1.6 µm that is specified in Table 2 of JIS B 0659-1: 2002, Annex 1 (reference), Standard Surface Roughness Piece for Comparison). Each molded sample is exposed to light with a penlight in a dark room, and whether or not pinholes or cracks are generated in an aluminum alloy foil is confirmed by light transmission. The molding depth smaller by 0.5 mm than the molding depth at which pinholes or cracks occurred in the battery packaging material is defined as a limited molding depth of the sample.

In the battery packaging material of the present invention, a curl amount t measured under the following conditions is preferably less than 20 mm.

<Evaluation of Curling>

The battery packaging material (width (TD) 200 mm×length (MD) 300 m) is wound into a roll shape around a cylindrical winding core (circular cross-section inner diameter: 76 mm, outer diameter: 86 mm) in a lengthwise direction to obtain a winding body. At this time, the battery packaging material is wound so that the heat-sealable resin layer of the battery packaging material is located inside. For example, when a total thickness of the battery packaging material is 143 the circular cross-section diameter of the winding body (including the circular cross-section diameter of the winding core) is 249 mm. The obtained winding body is allowed to stand for 24 hours in an environment of a temperature of 25° C. and a relative humidity of 50%. Next, the battery packaging material is unwound from the winding body, and five rectangular test samples (width: 150 mm, length: 90 mm) are obtained by cutting at predetermined intervals in a lengthwise direction so as to include a center portion in the width direction of the rewound battery packaging material, and two 100 mm long incisions are made on the diagonal of each test sample. This creates four vertices at the center of the test sample. Next, the test sample is allowed to stand for 8 hours or more in a dry room environment of a temperature of 25° C. and a dew point of −20° C. or lower. The test sample is then placed on a horizontal plane with the four vertices of the curled test sample facing up. For each of the four vertex portions formed by cutting the test sample to make incisions, the shortest distance from the horizontal plane (distance in a vertically upward direction from the horizontal plane) is measured, a maximum value of the four shortest distances is taken as a curl amount of each of them, and an average value of the curl amounts of five test samples is taken as the curl amount t in the test sample. A more specific method is as described in Examples.

Figure 10:
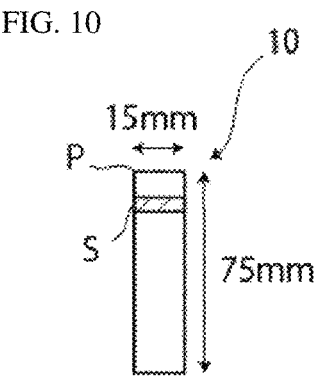
FIG. 10 is a schematic diagram for explaining the method of measuring the seal strength.
Figure 11:
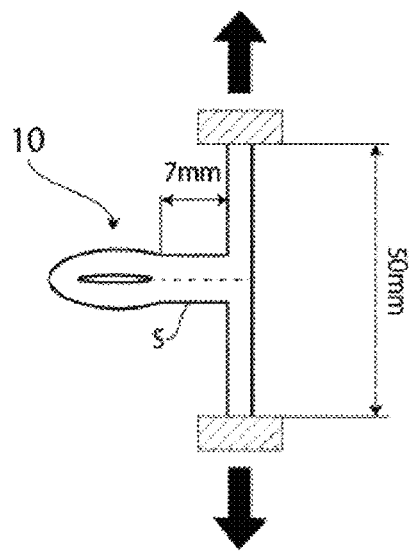
FIG. 11 is a schematic diagram for explaining the method of measuring the seal strength.

In the battery packaging material 10 of the present invention, in a state where a pair of the heat-sealable resin layers 4 are opposite to each other, the pair of the heat-sealable resin layers 4 are thermally welded to each other with use of a metal plate 20 having a width of 7 mm by heating the heat-sealable resin layers 4 under pressure from both sides of the test sample in the laminating direction under conditions of a temperature of 190° C., a surface pressure of 2.0 MPa, and a time of 3 seconds (see, FIGS. 9 and 10). and then, as shown in FIG. 11, the thermally-welded interface is peeled in a T-shaped manner by using a tensile tester in an environment of a temperature of 25° C. and under conditions of a tensile speed of 300 mm/min, a peeling angle of 180°, and an inter-chuck distance of 50 mm for 1.5 seconds from the start of tensile strength measurement to measure the maximum value of the tensile strength (seal strength). The maximum value of the tensile strength is preferably 110 N/15 mm or more and more preferably 120 N/15 mm or more. The upper limit of the tensile strength is, for example, about 200 N/15 mm or less, and the preferred ranges include 110 to 200 N/15 mm and 120 to 200 N/15 mm. In order to set the tensile strength as described above, for example, the type, composition, molecular weight, and the like of the resin forming the heat-sealable resin layer 4 are adjusted.

In addition, in the battery packaging material 10 of the present invention, in a state where a pair of the heat-sealable resin layers 4 are opposite to each other, the pair of the heat-sealable resin layers 4 are thermally welded to each other with use of the metal plate 20 having a width of 7 mm by heating the heat-sealable resin layers 4 under pressure from both sides of the test sample in the laminating direction under conditions of a temperature of 190° C., a surface pressure of 2.0 MPa, and a time of 3 seconds (see, FIGS. 9 and 10). and then, as shown in FIG. 11, the thermally-welded interface is peeled in a T-shaped manner by using a tensile tester in an environment of a temperature of 140° C. and under conditions of a tensile speed of 300 mm/min, a peeling angle of 180°, and an inter-chuck distance of 50 mm for 1.5 seconds from the start of tensile strength measurement to measure the maximum value of the tensile strength (seal strength). The maximum value is preferably 3.0 N/15 mm or more and more preferably 4.0 N/15 mm or more. The upper limit of the tensile strength is, for example, about 5.0 N/15 mm or less, and the preferred ranges include 3.0 to 5.0 N/15 mm and 4.0 to 5.0 N/15 mm. As described above, since a heat resistant temperature of a separator inside the battery is generally set to around 120 to 140° C., in the battery packaging material of the present invention, the maximum value of the tensile strength (seal strength) in a high temperature environment of 140° C. preferably satisfies the above value. In order to set the tensile strength as described above, for example, the type, composition, molecular weight, and the like of the resin forming the heat-sealable resin layer 4 are adjusted.

As shown in Examples below, the tensile test at each temperature is performed in a constant temperature bath. In the constant temperature bath whose temperature has reached a predetermined temperature (25° C. or 140° C.), the test sample is attached to a chuck and held for 2 minutes, and then measurement is started.

The battery packaging material 10 is brought into contact with an electrolyte (a solution in which a concentration of lithium hexafluorophosphate is 1 mol/l and a volume ratio of ethylene carbonate, diethyl carbonate and dimethyl carbonate is 1:1:1) in an environment of 85° C. for 72 hours, and then, in a state where the electrolyte is attached to a surface of the heat-sealable resin layer 4, the pair of the heat-sealable resin layers 4 are thermally welded to each other under conditions of a temperature of 190° C., a surface pressure of 2.0 MPa, and a time of 3 seconds, and the battery packaging material 10 has a seal strength at the time of peeling the thermally-welded interface of preferably 60% or more (the retention of the seal strength is 60% or more), more preferably 80% or more, and still more preferably 100% of the seal strength in the case of not bringing the battery packaging material 10 into contact with the electrolyte.

(Method of Measuring Retention of Seal Strength)

The seal strength before the contact with the electrolyte measured by the following method is used as the reference (100%), and the retention (%) of the seal strength after the contact with the electrolyte is calculated.

<Measurement of Seal Strength Before Contact with Electrolyte>

The tensile strength (seal strength) is measured in the same manner as a manner <Measurement of seal strength after contact with electrolyte> described below except that the electrolyte is not injected into the test sample. A maximum tensile strength until the thermally-welded portion is completely peeled is defined as the seal strength before the contact with the electrolyte.

<Measurement of Seal Strength after Contact with Electrolyte>

Figure 12:
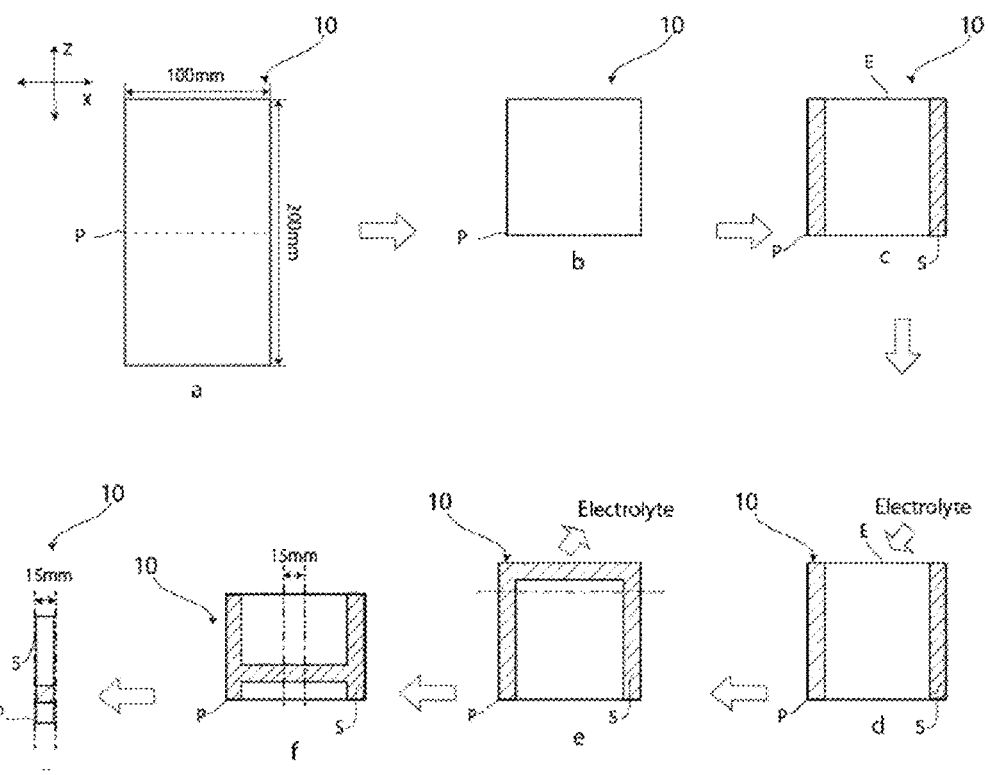
FIG. 12 is a schematic diagram for explaining the method of measuring the seal strength.

As shown in the schematic diagram of FIG. 12, the battery packaging material 10 is cut into a rectangle having a width (x direction) of 100 mm×a length (z direction) of 200 mm to obtain test samples (FIG. 12*a*). Each test sample is folded back at a center P in a z direction so that the heat-sealable resin layer 4 side overlaps (FIG. 12*b*). Next, both ends in the x direction of the folded-back test sample are sealed by heat sealing (temperature: 190° C., surface pressure: 2.0 MPa, time: 3 seconds) to form a bag shape having one opening E (FIG. 12*c*). Next, from the opening E of the test sample formed into a bag shape, 6 g of the electrolyte (solution which is the solution in which the concentration of lithium hexafluorophosphate is 1 mol/l and the volume ratio of ethylene carbonate, diethyl carbonate and dimethyl carbonate is 1:1:1) is injected (FIG. 12*d*), and an end of the opening E is sealed by heat sealing (temperature: 190° C., surface pressure: 2.0 MPa, time: 3 seconds) (FIG. 12*e*). Next, with the folded-back portion of the bag-shaped test sample facing downward, the test sample is allowed to stand in an environment of a temperature of 85° C. for a predetermined storage time (the time of contact with the electrolyte, such as 72 hours). Next, an end opposite to a folded piece of the test sample is cut (FIG. 12*e*), and the electrolyte is completely discharged. Next, in the state in which the electrolyte is attached to the surface of the heat-sealable resin layer 4, upper and lower surfaces of the test sample are sandwiched between metal plates (7 mm width) at an inner position in the Z direction by about 10 mm away from a fold P, and the pair of the heat-sealable resin layers 4 are thermally welded to each other under conditions of a temperature of 190° C., a surface pressure of 1.0 MPa, and a time of 3 seconds (FIG. 12*f*). Next, the test sample is cut into a width of 15 mm with a two-edged sample cutter so that the seal strength at a width (x direction) of 15 mm can be measured (FIGS. 12*f* and 12*g*). Next, in the form of T-peel, using a tensile tester, in the environment of a temperature of 25° C., the thermally-welded interface is peeled under the conditions of a tensile speed of 300 mm/min, a peeling angle of 180°, and an inter-chuck distance of 50 mm to measure the tensile strength (seal strength) (FIG. 11). The maximum tensile strength until the thermally-welded portion is completely peeled is defined as the seal strength after the contact with the electrolyte.

2. Each Layer Forming Battery Packaging Material

[Polyester Film Layer 1]

In the battery packaging material of the present invention, the polyester film layer 1 is a layer located on the outermost layer side and functioning as a base substrate layer. Specific examples of the polyester forming the polyester film layer 1 include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerization polyester including butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. One kind of these polyesters may be used, or two or more kinds of these polyesters may be used in combination. A polyester has the advantage that it is excellent in electrolyte resistance, so that whitening and the like due to deposition of an electrolyte is hard to occur, and thus the polyester is suitably adopted as a material for formation of the polyester layer 1.

The polyester film layer 1 is preferably configured from a stretched polyester film such as a biaxially stretched polyester film, particularly a stretched polyethylene terephthalate film such as a biaxially stretched polyethylene terephthalate film.

In the present invention, the thickness of the polyester film layer 1 needs to be 23 to 27 μm. In the present invention, the polyester film layer 1 is used as the base substrate layer, and the thickness is set to 23 to 27 μm, whereby it is possible to provide a battery packaging material excellent in surface insulating properties in which the insulation breakdown voltage is 13 kV or more and the curling of the battery packaging material being effectively suppressed. In particular, when the thickness of the polyester film layer 1 becomes relatively large in relation to the thickness of the heat-sealable resin layer 4, the battery packaging material 10 tends to be curled on the polyester film layer 1 side, and when the thickness becomes relatively small, the battery packaging material 10 tends to be curled on the heat-sealable resin layer 4 side. However, in the present invention, since the thickness of the polyester film layer 1 and the thickness of the heat-sealable resin layer 4 are set to specific ranges, curling is effectively suppressed. In the present invention, the thickness of the polyester film layer 1 is preferably about 25 to 27 μm from the viewpoint of effectively suppressing curling and improving the surface insulating properties of the battery packaging material 10. The influence of the thickness of the polyester film layer 1 and the thickness of the heat-sealable resin layer 4 on the occurrence of curling is as described above.

In the present invention, a lubricant may exist on the surface on the polyester film layer 1 side. When the lubricant exists on the surface on the polyester film layer 1 side, the abundance of the lubricant is not particularly limited but is, for example, preferably about 3 mg/m$^2$ or more, more preferably about 4 to 15 mg/m$^2$, and still more preferably about 5 to 14 mg/m$^2$.

The lubricant existing on a surface of the polyester film layer 1 may be one oozed out from a lubricant contained in a resin forming the polyester film layer 1, or one applied on the surface of the polyester film layer 1. The lubricant may be contained in the polyester film layer 1.

The lubricant is not particularly limited but is preferably an amide-based lubricant. Specific examples of the lubricant include saturated fatty acid amides, unsaturated fatty acid amides, substituted amides, methylol amides, saturated fatty acid bis-amides, and unsaturated fatty acid bis-amides. Specific examples of the saturated fatty acid amide include lauric acid amides, palmitic acid amides, stearic acid amides, behenic acid amides, and hydroxystearic acid amides. Specific examples of the unsaturated fatty acid amide include oleic acid amides and erucic acid amides. Specific examples of the substituted amide include N-oleylpalmitic acid amides, N-stearylstearic acid amides, N-stearyloleic acid amides, N-oleylstearic acid amides, and N-stearylerucic acid amides. Specific examples of the methylol amide include methylolstearic acid amides. Specific examples of the saturated fatty acid bis-amide include methylene-bis-stearic acid amides, ethylene-bis-capric acid amides, ethylene-bis-lauric acid amides, ethylene-bis-stearic acid amides, ethylene-bis-hydroxystearic acid amides, ethylene-bis-behenic acid amides, hexamethylene-bis-stearic acid amides, hexamethylene-bis-behenic acid amides, hexamethylene-hydroxystearic acid amides, N,N'-distearyladipic acid amides, and N,N'-distearylsebacic acid amides. Specific examples of the unsaturated fatty acid bis-amide include ethylene-bis-oleic acid amides, ethylene-bis-erucic acid amides, hexamethylene-bis-oleic acid amides, N,N'-dioleyladipic acid amides, and N,N'-dioleylsebacic acid amides. Specific examples of the fatty acid ester amide include stearamide ethyl stearates. Specific examples of the aromatic bis-amide include m-xylylene-bis-stearic acid amides, m-xylylene-bis-hydroxystearic acid amides, and N,N'-distearylisophthalic acid amides. One kind of the lubricants may be used, or two or more kinds of the lubricants may be used in combination.

[Adhesive Agent Layer 2]

In the battery packaging material of the present invention, the adhesive agent layer 2 is a layer provided between the polyester film layer 1 and the aluminum alloy foil layer 3 as necessary for strongly bonding these layers.

The adhesive agent layer 2 is formed from an adhesive capable of bonding the polyester film layer 1 and the aluminum alloy foil layer 3. The adhesive may be a two-liquid curable adhesive, or may be a one-liquid curable adhesive. In addition, an adhesive mechanism of an adhesive adopted for forming the adhesive agent layer 2 is not particularly limited and may be any one of a chemical reaction type, a solvent volatilization type, a heat melting type, a heat pressing type, and the like.

Specific examples of the adhesive component that can be usable for forming the adhesive agent layer 2 include polyester-based resins such as polyethylene terephthalate, polybutylene terephthalate, polyethylene naphthalate, polybutylene naphthalate, polyethylene isophthalate, polycarbonate, and copolymer polyester; a polyether-based adhesive agent; a polyurethane-based adhesive agent; an epoxy-based resin; a phenol-based resin; polyamide-based resins such as nylon 6, nylon 66, nylon 12, and a copolyamide; polyolefin-based resins such as a polyolefin, a carboxylic acid-modified polyolefin, and a metal-modified polyolefin, and a polyvinyl acetate-based resin; a cellulose-based adhesive agent; a (meth)acrylic-based resin; a polyimide-based resin; amino resins such as a urea resin and a melamine resin; rubber such as chloroprene rubber, nitrile rubber, and styrene-butadiene rubber; and a silicone-based resin. One kind of these adhesive components may be adopted, or two or more kinds of these adhesive components may be adopted in combination. Among these adhesive components, a polyurethane-based adhesive agent is preferred, for example.

The thickness of the adhesive agent layer 2 is not particularly limited as long as it exhibits a function as an adhesive layer, and is, for example, about 1 to 10 μm, preferably about 2 to 5 μm.

[Aluminum Alloy Foil Layer 3]

In the battery packaging material, the aluminum alloy foil layer 3 is a layer which functions to improve the strength of the battery packaging material, and also functions as an aluminum alloy foil layer for preventing ingress of water vapor, oxygen, light and the like into the battery. The aluminum alloy foil layer 3 is configured from an aluminum alloy. From the viewpoint of further improving moldability of the battery packaging material and effectively suppressing curling, the aluminum alloy foil layer 3 is, for example, preferably formed of soft aluminum alloy such as annealed aluminum alloy (JIS H4160: 1994 A8021H-O, JIS H4160: 1994 A8079H-O, JIS H4000: 2014 A8021P-O, JIS H4000: 2014 A8079P-O). Among these alloys, the aluminum alloy foil layer 3 is particularly preferably formed of aluminum alloy having the composition specified in JIS H4160: 1994 A8021H-O.

The thickness of the aluminum alloy foil layer 3 needs to be in the range of 27 to 43 μm. From the viewpoint of more effectively suppressing curling of the battery packaging material, the thickness is preferably about 33 to 37 μm, and more preferably about 35 to 37 μm.

It is preferable that at least one surface, preferably both surfaces of the aluminum alloy foil layer 3 are subjected to a chemical conversion treatment for stabilization of bonding, prevention of dissolution and corrosion, and so on. Here, the chemical conversion treatment is a treatment for forming an acid resistant film on the surface of the aluminum alloy foil layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, one kind of the repeating units represented by the following general formulae (1) to (4) may be contained, or two or more kinds of the repeating units represented by the following general formulae (1) to (4) may be contained in combination.

[Chem. 1]

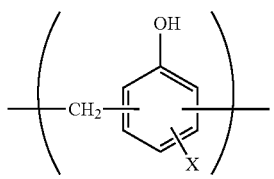

(1)

[Chem. 2]

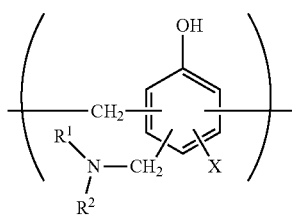

(2)

[Chem. 3]

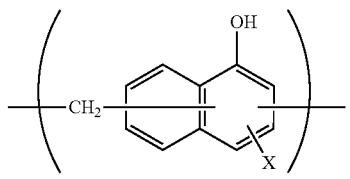

(3)

[Chem. 4]

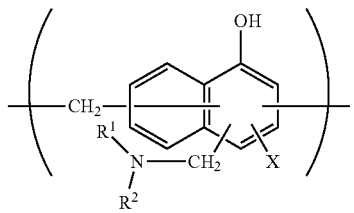

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl groups and the hydroxyalkyl groups represented by X, $R^1$, and $R^2$ may be identical or different. In the general formulae (1) to (4), X is preferably a hydrogen atom, a hydroxyl group, or a hydroxyalkyl group. The number average molecular weight of the aminated phenolic polymer having a repeating unit(s) represented by the general formulae (1) to (4) is, for example, preferably 500 to 1000000, and more preferably 1000 to 20000.

Examples of a chemical conversion treatment method for imparting corrosion resistance to the aluminum alloy foil layer 3 include a method for coating the aluminum alloy foil layer 3 with a dispersion of fine particles of a metal oxide such as aluminum oxide, titanium oxide, cerium oxide, or tin oxide, or barium sulfate in phosphoric acid, and baking the aluminum alloy foil layer 3 coated with the dispersion of fine particles at 150° C. or higher to form a corrosion resistance treatment layer on a surface of the aluminum alloy foil layer 3. A resin layer with a cationic polymer crosslinked with a crosslinking agent may be further formed on the corrosion resistance treatment layer. Here, examples of the cationic polymer include polyethyleneimine, an ion polymer complex formed of a polymer having polyethyleneimine and a carboxylic acid, a primary amine-grafted acrylic resin obtained by graft-polymerizing a primary amine with an acrylic main backbone, polyallylamine or derivatives thereof, and an aminophenol. One kind of these cationic polymers may be adopted, or two or more kinds of these cationic polymers may be adopted in combination. Examples of the crosslinking agent include a compound having at least one functional group selected from the group consisting of an isocyanate group, a glycidyl group, a carboxyl group, and an oxazoline group, and a silane coupling agent. One kind of these crosslinking agents may be adopted, or two or more kinds of these crosslinking agents may be adopted in combination.

As for the chemical conversion treatment, only one chemical conversion treatment may be performed, or two or more chemical conversion treatments may be performed in combination. These chemical conversion treatments may be performed using one kind of compounds, or two or more kinds of compounds in combination. Among the chemical conversion treatments, a chromic acid chromate treatment, a chromate treatment using a chromic acid compound, a phosphoric acid compound and an aminated phenol polymer in combination, and other treatments are preferred.

The amount of the acid resistance film to be formed on the surface of the aluminum alloy foil layer 3 in the chemical conversion treatment is not particularly limited, and for example when the chromate treatment described above is performed, it is desirable that the chromic acid compound be contained in an amount of 0.5 to 50 mg, preferably about 1.0 to 40 mg, in terms of chromium, the phosphorus compound be contained in an amount of about 0.5 to 50 mg, preferably about 1.0 to 40 mg, in terms of phosphorus, and the aminated phenol polymer be contained in an amount of about 1 to 200 mg, preferably about 5.0 to 150 mg, per 1 $m^2$ of the surface of the aluminum alloy foil layer 3.

The chemical conversion treatment is performed in the following manner: a solution containing a compound to be used for formation of an acid resistant film is applied to the surface of the aluminum alloy foil layer by a bar coating method, a roll coating method, a gravure coating method, an immersion method or the like; and heating is then performed so that the temperature of the aluminum alloy foil layer reaches 70 to 200° C. The aluminum alloy foil layer may be subjected to a degreasing treatment by an alkali immersion method, an electrolytic cleaning method, an acid cleaning method, an electrolytic acid cleaning method or the like before the aluminum alloy foil layer is subjected to a chemical conversion treatment. When a degreasing treatment is performed as described above, the chemical conversion treatment of the surface of the aluminum alloy foil layer can be further efficiently performed.

[Heat-Sealable Resin Layer 4]

In the battery packaging material of the present invention, the heat-sealable resin layer 4 is the innermost layer, and during the assembly of a battery, a pair of the heat-sealable resin layers are thermally welded to each other to hermetically seal the battery element.

The resin component to be adopted in the heat-sealable resin layer 4 is not particularly limited as long as it can be thermally welded, and examples thereof include polyolefins, cyclic polyolefins, acid-modified polyolefins and acid-modified cyclic polyolefins. That is, the resin forming the heat-sealable resin layer 4 may optionally have a polyolefin backbone and preferably has a polyolefin backbone. Whether the polyolefin backbone is contained in the resin forming the heat-sealable resin layer 4 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 $cm^{-1}$ and around 1780 $cm^{-1}$. When the degree of acid modification is low, however, a peak becomes small to be sometimes undetected. In that case, analysis can be performed by nuclear magnetic resonance spectroscopy.

Specific examples of the polyolefin include polyethylene such as low-density polyethylene, medium-density polyethylene, high-density polyethylene, and linear low-density polyethylene; polypropylene such as homopolypropylene, polypropylene as a block copolymer (e.g., a block copolymer of propylene and ethylene), and polypropylene as a random copolymer (e.g., a random copolymer of propylene and ethylene); and a terpolymer of ethylene-butene-propylene. Among these polyolefins, polyethylene and polypropylene are preferred, and random polypropylene is further preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The acid-modified polyolefin is a polymer with the polyolefin modified by subjecting the polyolefin to block polymerization or graft polymerization with an acid component such as a carboxylic acid. Examples of the acid component to be used for acid modification include carboxylic acids and anhydrides thereof such as maleic acid, acrylic acid, itaconic acid, crotonic acid, maleic anhydride and itaconic anhydride.

The acid-modified cyclic polyolefin is a polymer obtained by performing copolymerization with an $\alpha,\beta$-unsaturated carboxylic acid or an anhydride thereof replacing a part of monomers that form the cyclic polyolefin, or by block-polymerizing or graft-polymerizing an acid component such as an $\alpha,\beta$-unsaturated carboxylic acid or an anhydride thereof with the cyclic polyolefin. The cyclic polyolefin to be modified with a carboxylic acid is the same as described above. For example, the acid component to be used for acid modification is the same as that used for acid modification of the polyolefin.

The heat-sealable resin layer 4 particularly preferably contains a random polypropylene film.

The heat-sealable resin layer 4 may be formed from one kind of resin components, or may be formed from a blend polymer obtained by combining two or more kinds of resin components. Further, the heat-sealable resin layer 4 may be formed of only one layer, or may be formed of two or more layers with the same resin component or different resin components.

The heat-sealable resin layer 4 formed of two layers preferably has a two-layer configuration in which an acid-modified polyolefin film (such as an acid-modified polypropylene film) and a polyolefin film (such as a random polypropylene film) are laminated in order from the aluminum alloy foil layer 3 side. At this time, examples of a ratio of thickness of the acid-modified polyolefin film and thickness of the polyolefin film (acid-modified polyolefin film: polyolefin film) include about 1:0.5 to 1:1.5, about 1:0.8 to 1:1.2, and about 1:0.9 to 1:1.1.

In the laminate constituting the battery packaging material, the logarithmic decrement $\Delta E$ at 80° C. in the rigid-body pendulum measurement of a surface on the heat-sealable resin layer 4 side is 0.04 or more. Consequently, curling can be suppressed more effectively. From the viewpoint of effectively suppressing curling, the value of the logarithmic decrement ΔE is, for example, preferably about 0.04 to 0.10, and more preferably about 0.05 to 0.08. The logarithmic decrement ΔE is a value measured by the following method, and specifically can be measured by the method described in Examples.

<Measurement of Logarithmic Decrement ΔE>

Figure 8:
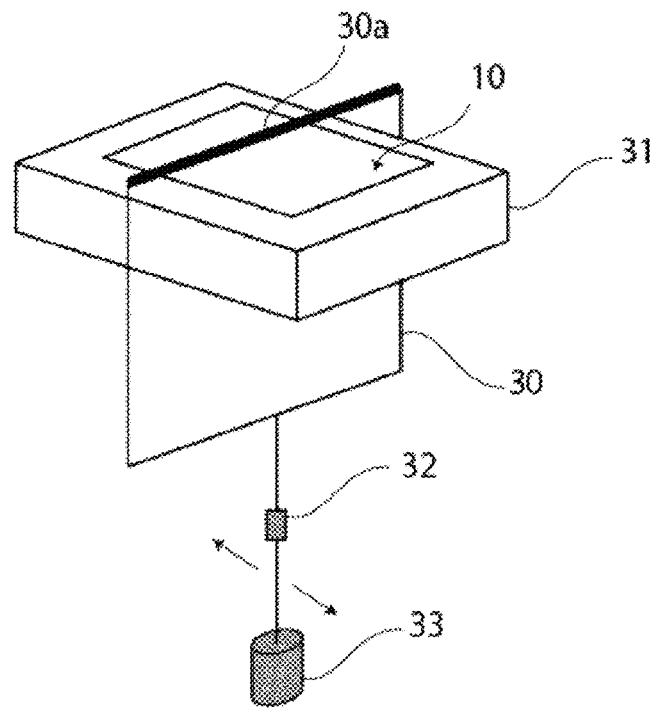
FIG. 8 is a schematic diagram for explaining a method of measuring a logarithmic decrement ΔE by a rigid-body pendulum measurement.

Each of the battery packaging materials obtained above is cut into a rectangle having a width (TD: Transverse Direction) of 15 mm×a length (MD: Machine Direction) of 50 mm to obtain test samples. The MD of the battery packaging material corresponds to a rolling direction (RD) of the aluminum alloy foil, the TD of the battery packaging material corresponds to the TD of the aluminum alloy foil, and the rolling direction (RD) of the aluminum alloy foil can be identified by rolling marks. When the MD of the battery packaging material cannot be specified by rolling marks of the aluminum alloy foil, the MD can be specified by the following method. As a method of confirming the MD of the battery packaging material, a sea-island structure is confirmed by observing the cross section of the heat-sealable resin layer of the battery packaging material with an electron microscope, and a direction parallel to a cross section where an average of the diameter of the shape of the island in a direction perpendicular to the thickness direction of the heat-sealable resin layer is maximum can be judged as the MD. Specifically, the angle of the cross section of the heat-sealable resin layer in one direction is varied by 10 degrees from the direction parallel to the cross section in the one direction, and each of cross sections (a total of ten cross sections) from the direction parallel to the cross section in one direction to the direction perpendicular to the cross section in the one direction is observed by electron microscope to identify a sea-island structure. Next, the shape of each individual island is observed in each cross section. With respect to the shape of individual island, a diameter y is defined as a linear distance connecting its leftmost and rightmost ends in a direction perpendicular to the thickness direction of the heat-sealable resin layer. In each cross section, an average value of the diameter y of top 20 islands in decreasing order of the diameter y of the island shape is calculated. A direction parallel to the cross section where the average of the diameter y of the island shape is the largest is judged as the MD. FIG. 8 shows a schematic diagram for explaining a method of measuring the logarithmic decrement ΔE by the rigid-body pendulum measurement. A rigid-body pendulum physical property tester (for example, model: RPT-3000W from A&D Company, Limited) is used, FRB-100 is used as a frame of a pendulum 30, RBP-060 is used as a cylindrical edge 30a of an edge portion, and CHB-100 is used as a cooling/heating block 31. Additionally, a vibration displacement detector 32 and a weight 33 are used, and an initial amplitude is set to about 0.3 degrees. First, a test sample (battery packaging material 10) is placed on the cooling/heating block 31, with the measurement surface (heat-sealable resin layer) facing upward, and the cylindrical edge 30a equipped with the pendulum 30 is mounted on the measurement surface such that the axial direction becomes orthogonal to the MD direction of the test sample and the cylindrical edge 30a is in contact with the surface of the heat-sealable resin layer. In order to prevent floating or warping of the test sample during measurement, the test sample is fixed on the cooling/heating block 31 by applying a Kapton tape to its regions that do not affect the measurement results. Next, using the cooling/heating block 31, the logarithmic decrement ΔE of the surface of the heat-sealable resin layer is measured in a temperature range of 30° C. to 200° C. at a temperature elevation rate of 3° C./min. The logarithmic decrement ΔE in a state where a surface temperature of the heat-sealable resin layer of the test sample (battery packaging material 10) has reached 80° C. is adopted. After measured once, the test sample is not used again, and a new test sample prepared by cutting is used. The average value of three measurements (N=3) is adopted.

The logarithmic decrement ΔE is calculated by the following formula:

$$\Delta E = [\ln(A1/A2) + \ln(A2/A3) + \ldots + \ln(An/An+1)]/n$$

A: Amplitude n: Wavenumber

In the present invention, the thickness of the heat-sealable resin layer 4 is not particularly limited as long as it is 70 to 100 and the thickness of the heat-sealable resin layer 4 is preferably about 70 to 100 and more preferably about 70 to 90 μm from the viewpoint of improving moldability, effectively suppressing curling, and more effectively suppressing leakage of the electrolyte.

In the present invention, a lubricant may exist on the surface of the heat-sealable resin layer 4. When the lubricant exists on the surface of the heat-sealable resin layer 4, the abundance of the lubricant is not particularly limited and is preferably about 3 mg/m$^2$ or more, more preferably about 4 to 15 mg/m$^2$, and still more preferably about 5 to 14 mg/m$^2$ at a temperature of 24° C. under a relative humidity of 60%.

The lubricant existing on the surface of the heat-sealable resin layer 4 can be one oozed out from a lubricant contained in the resin forming the heat-sealable resin layer 4, or one applied on the surface of the heat-sealable resin layer 4. The lubricant may be contained in the heat-sealable resin layer 4.

The lubricant is not particularly limited and a known lubricant may be adopted. Examples of the lubricant include those exemplified above for the polyester film 1. One kind of these lubricants may be adopted, or two or more kinds of these lubricants may be adopted in combination.

Figure 13:
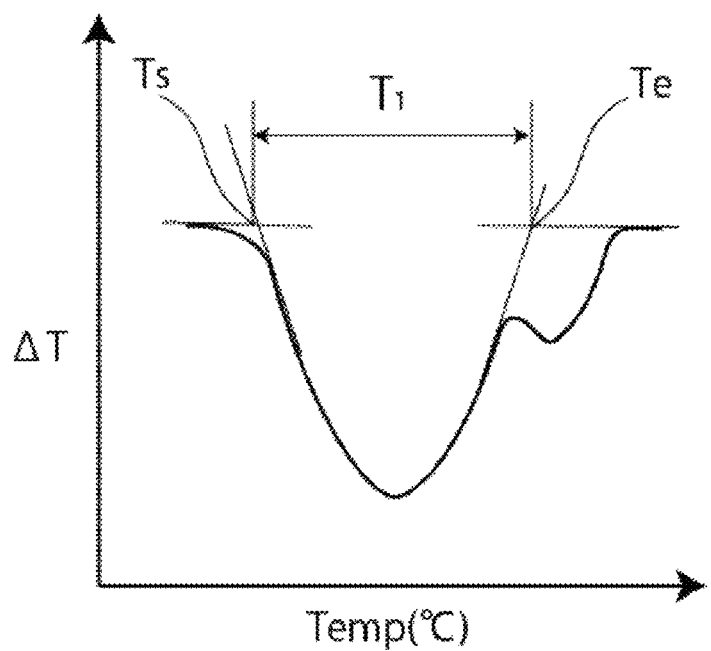
FIG. 13 is a diagram schematically showing a temperature difference $T_1$ and a temperature difference $T_2$ in differential scanning calorimetry.
Figure 13:
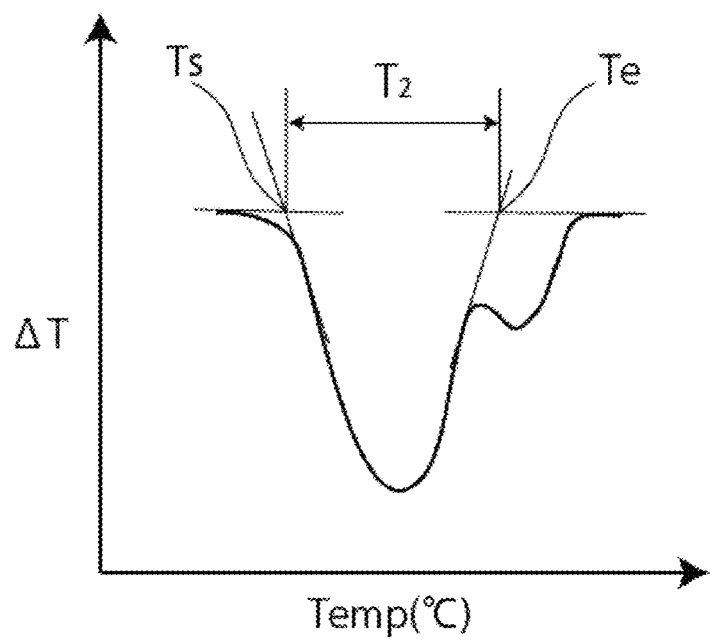

From the viewpoint of achieving higher seal strength by thermal welding even when an electrolyte is in contact with the heat-sealable resin layer in a high-temperature environment and a pair of the heat-sealable resin layers are thermally welded to each other with the electrolyte being attached thereto, when the temperature difference $T_1$ and the temperature difference $T_2$ are measured by the following method, a value (ratio $T_2/T_1$) obtained by dividing the temperature difference $T_2$ by the temperature difference $T_1$ is, for example, preferably 0.55 or more, and more preferably 0.60 or more. As is understood from the measurements of the temperature differences $T_1$ and $T_2$ described below, it means that as the ratio $T_2/T_1$ becomes closer to an upper limit of 1.0, a difference of an onset point (extrapolation melting onset temperature) and a termination point (extrapolation melting termination temperature) of a melting peak between before and after the heat-sealable resin layer is in contact with the electrolyte becomes smaller (see the schematic diagram of FIG. 13). That is, the value of $T_2$ is usually not more than the value of $T_1$. One reason that the difference between the extrapolation melting onset temperature and the extrapolation melting termination temperature of the melting peak increases is that when a low-molecular-weight resin included in the resin constituting the heat-sealable resin layer is in contact with the electrolyte, the resin is eluted into the electrolyte, and the difference between the extrapolation melting onset temperature and the extrapolation melting termination temperature of the melting peak of the heat-sealable resin layer after the contact with the electrolyte becomes smaller than that before the contact with the electrolyte. One example of the method for reducing the difference between the extrapolation melting onset temperature and the extrapolation melting termination temperature of the melting peak is a method in which the proportion of the low-molecular-weight resin included in the resin constituting the heat-sealable resin layer is adjusted.

(Measurement of Temperature Difference $T_1$)

In accordance with the conditions as defined in JIS K 7121:2012, using differential scanning calorimetry (DSC), a DSC curve is obtained for a resin adopted for the heat-sealable resin layer of each of the battery packaging materials described above. The temperature difference $T_1$ between the extrapolation melting onset temperature and the extrapolation melting termination temperature of the melting peak temperature of the heat-sealable resin layer is measured from the obtained DSC curve.

(Measurement of Temperature Difference $T_2$)

In an environment of a temperature of 85° C., the rein adopted for the heat-sealable resin layer is allowed to stand for 72 hours in an electrolyte which is the solution in which the concentration of lithium hexafluorophosphate is 1 mol/l and the volume ratio of ethylene carbonate, diethyl carbonate and dimethyl carbonate is 1:1:1, and then sufficiently dried. Next, in accordance with the conditions as defined in JIS K 7121:2012, using differential scanning calorimetry (DSC), a DSC curve is obtained for the heat-sealable resin layer after drying. Next, the temperature difference $T_2$ between the extrapolation melting onset temperature and the extrapolation melting termination temperature of the melting peak temperature of the heat-sealable resin layer after drying is measured from the obtained DSC curve.

In the measurement of the extrapolation melting onset temperature and the extrapolation melting termination temperature of the melting peak temperature, a commercially available differential scanning calorimeter can be adopted. As for the DSC curve, the test sample is held at −50° C. for 10 minutes, and then heated to 200° C. at a temperature elevation rate of 10° C./min (first time) and held at 200° C. for 10 minutes, and then cooled to −50° C. at a temperature reduction rate of −10° C./min and held at −50° C. for 10 minutes, and then heated to 200° C. at a temperature elevation rate of 10° C./min (second time) and held at 200° C. for 10 minutes. As the DSC curve, a DSC curve obtained when the test sample is heated to 200° C. for the second time is adopted. Moreover, for the measurement of the temperature difference $T_1$ and the temperature difference $T_2$, the melting peak having the maximum difference in thermal energy input among melting peaks that appear in a range of 120 to 160° C. in each of the DSC curves is analyzed. Even when two or more overlapping peaks are present, only the melting peak having the maximum difference in thermal energy input is analyzed.

The extrapolation melting onset temperature refers to the onset point of the melting peak temperature, and is defined as the temperature at the intersection point between the straight line formed by extending the lower temperature (65 to 75° C.)-side baseline to the higher temperature side, and the tangent drawn at the point having the maximum gradient to the lower temperature-side curve of the melting peak having the maximum difference in thermal energy input. The extrapolation melting termination temperature refers to the termination point of the melting peak temperature, and is defined as the temperature at the intersection point between the straight line formed by extending the higher temperature (170° C.)-side baseline to the lower temperature side, and the tangent drawn at the point having the maximum gradient to the higher temperature-side curve of the melting peak having the maximum difference in thermal energy input.

In the battery packaging material of the present invention, from the viewpoint of achieving higher seal strength by thermal welding even when an electrolyte is in contact with the heat-sealable resin layer in a high-temperature environment and a pair of the heat-sealable resin layers are thermally welded to each other with the electrolyte being attached thereto, the value (ratio $T_2/T_1$) obtained by dividing the temperature difference $T_2$ by the temperature difference $T_1$ is, for example, 0.55 or more, preferably 0.60 or more, more preferably 0.70 or more, and even more preferably 0.75 or more, and preferred ranges include about 0.55 to 1.0, about 0.60 to 1.0, about 0.70 to 1.0, and about 0.75 to 1.0. The upper limit is 1.0, for example. In order to set the ratio $T_2/T_1$ as described above, for example, the type, composition, molecular weight, and the like of the resin forming the heat-sealable resin layer 4 are adjusted.

From the viewpoint of achieving higher seal strength by thermal welding even when an electrolyte is in contact with the heat-sealable resin layer in a high-temperature environment and a pair of the heat-sealable resin layers are thermally welded to each other with the electrolyte being attached thereto, an absolute value of a difference $|T_2-T_1|$ between the temperature difference $T_2$ and the temperature difference $T_1$ is, for example, about 15° C. or lower, preferably about 10° C. or lower, more preferably about 8° C. or lower, and still more preferably about 7.5° C. or lower, and preferred ranges include about 0 to 15° C., about 0 to 10° C., about 0 to 8° C., about 0 to 7.5° C., about 1 to 15° C., about 1 to 10° C., about 1 to 8° C., about 1 to 7.5° C., about 2 to 15° C., about 2 to 10° C., about 2 to 8° C., about 2 to 7.5° C., about 5 to 15° C., about 5 to 8° C., and about 5 to 7.5° C. The lower limit of the absolute value of the difference $|T_2-T_1|$ is, for example, 0° C., 1° C., 2° C., or 5° C. In order to set the absolute value of the difference $|T_2-T_1|$ as described above, for example, the type, composition, molecular weight, and the like of the resin forming the heat-sealable resin layer 4 are adjusted.

The temperature difference $T_1$ is preferably about 29 to 38° C., and more preferably about 32 to 36° C. The temperature difference $T_2$ is preferably about 17 to 30° C., and more preferably about 26 to 29° C. In order to set the temperature differences $T_1$ and $T_2$ as described above, for example, the type, composition, molecular weight, and the like of the resin forming the heat-sealable resin layer 4 are adjusted.

In the battery packaging material of the present invention, the logarithmic decrement ΔE at 120° C. in the rigid-body pendulum measurement of a surface of the heat-sealable resin layer 4 (when the heat-sealable resin layer 4 is formed of a plurality of layers, a layer closest to the aluminum alloy foil layer 3 side) on the aluminum alloy foil layer 3 side is preferably 0.50 or less, 0.40 or less, 0.30 or less, 0.22 or less, or further 0.20 or less. In the present invention, because the logarithmic decrement ΔE at 120° C. is, for example, 0.50 or less, 0.40 or less, 0.30 or less, 0.22 or less, or further 0.20 or less, when the battery element is sealed with the battery packaging material, crushing is effectively prevented when a pair of the heat-sealable resin layers are thermally welded to each other, and high seal strength is achieved in a high-temperature environment.

The logarithmic decrement at 120° C. in the rigid-body pendulum measurement is an index that represents the hardness of the resin in a high-temperature environment at 120° C., and means that the hardness of the resin increases as the logarithmic decrement decreases. In the rigid-body pendulum measurement, the decrement of the pendulum is measured while increasing the temperature of the resin from a lower temperature to a higher temperature. In general, in the rigid-body pendulum measurement, an edge portion is brought into contact with a surface of an object to be measured, and pendulum movement is performed in a horizontal direction to impart vibrations to the object to be measured. In the battery packaging material of the present invention, the heat-sealable resin layer 4 which has a logarithmic decrement of, for example, 0.50 or less, 0.40 or less, 0.30 or less, 0.22 or less, or further 0.20 or less in a high-temperature environment at 120° C., and is thereby hard, is arranged on the aluminum alloy foil layer 3 side so that crushing (thinning) of the battery packaging material at the time of thermal welding is prevented, and high seal strength can be achieved in the high-temperature environment.

The logarithmic decrement ΔE is calculated by the following formula:

$$\Delta E=[\ln(A1/A2)+\ln(A2/A3)+ \ldots \ln(An/An+1)]/n$$

A: Amplitude
n: Wavenumber

In the battery packaging material of the present invention, from the viewpoint of effectively preventing crushing when a pair of the heat-sealable resin layers 4 are thermally welded to each other, and achieving high seal strength in a high-temperature environment, the logarithmic decrement ΔE at 120° C. is, for example, about 0.10 to 0.50, about 0.10 to 0.40, about 0.10 to 0.30, about 0.10 to 0.22, about 0.10 to 0.20, or about 0.10 to 0.16. In order to set the logarithmic decrement ΔE as described above, for example, the type, composition, molecular weight, and the like of the resin forming the heat-sealable resin layer 4 (when the heat-sealable resin layer 4 is formed of a plurality of layers, the layer closest to the aluminum alloy foil layer 3 side) are adjusted.

In the measurement of the logarithmic decrement ΔE, a rigid-body pendulum physical property test on the heat-sealable resin layer 4 is performed using a commercially available rigid-body pendulum-type physical property tester, using a cylindrical edge as the edge portion to be pressed against the heat-sealable resin layer 4, at an initial amplitude of 0.3 degrees and at a temperature elevation rate of 3° C./min in the range of temperatures of 30° C. to 200° C. Then, based on the logarithmic decrement at 120° C., the criteria of the effect of the heat-sealable resin layer 4 of preventing crushing and the effect of improving the seal strength by means of thermal welding in a high-temperature environment are established. As for the heat-sealable resin layer 4 whose logarithmic decrement ΔE is to be measured, the battery packaging material is immersed in 15% hydrochloric acid to dissolve a polyester film layer and an aluminum alloy foil, and the sample having the heat-sealable resin layer only is sufficiently dried, and then subjected to the measurement.

The battery packaging material may be obtained from a battery to measure the logarithmic decrement ΔE of the heat-sealable resin layer 4. When the battery packaging material is obtained from a battery to measure the logarithmic decrement ΔE of the heat-sealable resin layer 4, a sample is cut out from a top surface portion where the battery packaging material has not been stretched by molding, and the sample is subjected to the measurement.

Thickness Remaining Ratio of Heat-Sealable Resin Layer

In the battery packaging material of the present invention, after a pair of the heat-sealable resin layers of the laminate constituting the battery packaging material are opposed to each other, and heated and pressed in a laminating direction at a temperature of 190° C. and a surface pressure of 0.5 MPa for a time of 3 seconds, the thickness remaining ratio of the heat-sealable resin layer 4 is preferably 70% or more, and more preferably 80% or more, and preferred ranges include 70 to 95% and 80 to 95%. The upper limit of the thickness remaining ratio is, for example, about 95%. The thickness remaining ratio is the value measured using the method described below. In order to set the thickness remaining ratio as described above, for example, the type, composition, molecular weight, and the like of the resin forming the heat-sealable resin layer 4 are adjusted.

<Measurement of Thickness Remaining Ratio of Heat-Sealable Resin Layer 4>

The battery packaging material is cut into a size of 150 mm in length×60 mm in width to prepare test samples. Next, a pair of the heat-sealable resin layers of each test sample are opposed to each other. Next, in this state, using a metal plate having a width of 7 mm, the pair of the heat-sealable resin layers are heated and pressed in the laminating direction from both sides of the test sample, at a temperature of 190° C. and a surface pressure of 0.5 MPa for a time of 3 seconds, so that the pair of the heat-sealable resin layers are thermally welded to each other. Next, the thermally-welded portion of the test sample is cut in the laminating direction using a microtome, and the total thickness of the two heat-sealable resin layers 4 thermally welded to each other is measured for the exposed cross section. Similarly, the test sample before thermal welding is cut in the laminating direction using a microtome, and the thicknesses of the pair of the two heat-sealable resin layers 4 are measured for the exposed cross section. A ratio of the total thickness of the two heat-sealable resin layers 4 after thermal welding, relative to the total thickness of the two heat-sealable resin layers 4 before thermal welding, is calculated to measure a remaining ratio (%) of the total thickness of the two heat-sealable resin layers 4.

Moreover, the battery packaging material may be obtained from a battery to measure the remaining ratio of the total thickness of the two heat-sealable resin layers 4. When the battery packaging material is obtained from a battery to measure the remaining ratio of the total thickness of the two heat-sealable resin layers 4, a sample is cut out from a top surface portion where the battery packaging material has not been stretched by molding, and the sample is subjected to the measurement.

The logarithmic decrement ΔE of the heat-sealable resin layer 4 can be adjusted by, for example, the melt mass-flow rate (MFR), the molecular weight, the melting point, the softening point, the molecular weight distribution, the degree of crystallinity, and the like of the resin constituting the heat-sealable resin layer 4.

[Adhesive Layer 5]

In the battery packaging material of the present invention, the adhesive layer 5 is a layer provided between the aluminum alloy foil layer 3 and the heat-sealable resin layer 4 as necessary for strongly bonding these layers.

The adhesive layer 5 is formed from a resin capable of bonding the aluminum alloy foil layer 3 and the heat-sealable resin layer 4. As the resin to be adopted for forming the adhesive layer 5, the same adhesives as those mentioned for the adhesive agent layer 2, in terms of adhesion mechanism, types of adhesive components, and the like, can be adopted. Furthermore, as the resin to be adopted for forming the adhesive layer 5, polyolefin-based resins mentioned above for the heat-sealable resin layer 4, such as polyolefins, cyclic polyolefins, acid-modified polyolefins, and acid-modified cyclic polyolefins, can be adopted. From the viewpoint of achieving excellent adhesion between the aluminum alloy foil layer 3 and the heat-sealable resin layer 4, the polyolefin is preferably acid-modified polyolefin, and particularly preferably acid-modified polypropylene. That is, the resin forming the adhesive layer 5 may optionally have a polyolefin backbone and preferably has a polyolefin backbone. Whether the polyolefin backbone is contained in the resin forming the adhesive layer 5 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 $cm^{-1}$ and around 1780 $cm^{-1}$. When the degree of acid modification is low, however, a peak becomes small to be sometimes undetected. In that case, analysis can be performed by nuclear magnetic resonance spectroscopy.

In addition, from the viewpoint of achieving a battery packaging material having excellent adhesiveness between the aluminum alloy foil layer 3 and the heat-sealable resin layer 4 and excellent electrolyte resistance, the adhesive layer 5 preferably contains acid-modified polyolefin and is more preferably formed of acid-modified polyolefin. The adhesive layer 5 may be a cured product of a resin composition containing acid-modified polyolefin and a curing agent. Preferred examples of the acid-modified polyolefin include the same acid-modified polyolefins and acid-modified cyclic polyolefins as mentioned for the heat-sealable resin layer 4.

The curing agent is not particularly limited as long as it cures the acid-modified polyolefin. Examples of the curing agent include an epoxy-based curing agent, a polyfunctional isocyanate-based curing agent, a carbodiimide-based curing agent, and an oxazoline-based curing agent.

The epoxy-based curing agent is not particularly limited as long as it is a compound having at least one epoxy group. Examples of the epoxy-based curing agent include epoxy resins, such as bisphenol A diglycidyl ether, modified bisphenol A diglycidyl ether, novolac glycidyl ether, glycerol polyglycidyl ether, and polyglycerol polyglycidyl ether.

The polyfunctional isocyanate-based curing agent is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymer or isocyanurate forms thereof, mixtures thereof, and copolymers thereof with other polymers.

The carbodiimide-based curing agent is not particularly limited as long as it is a compound having at least one carbodiimide group (—N=C=N—). The carbodiimide-based curing agent is preferably a polycarbodiimide compound having at least two or more carbodiimide groups.

The oxazoline-based curing agent is not particularly limited as long as it is a compound having an oxazoline backbone. Specific examples of the oxazoline-based curing agent include the Epocros series from Nippon Shokubai Co., Ltd.

From the viewpoint of improving the adhesion between the aluminum alloy foil layer 3 and the heat-sealable resin layer 4 by means of the adhesive layer 5, the curing agent may be composed of two or more compounds.

The content of the curing agent in the resin composition that forms the adhesive layer 5 is preferably in a range of 0.1 to 50% by mass, more preferably in a range of about 0.1 to 30% by mass, and still more preferably in a range of about 0.1 to 10% by mass.

The thickness of the adhesive layer 5 is not particularly limited as long as it exhibits the function as an adhesive layer, and is preferably about 0.1 to 50 µm, and more preferably about 0.5 to 40 µm, for example. When the adhesive mentioned for the adhesive agent layer 2 is used, the thickness of the adhesive layer 5 is preferably about 2 to 10 µm, and more preferably about 2 to 5 µm, for example. When the resin mentioned for the heat-sealable resin layer 4 is used, the thickness of the adhesive layer 5 is preferably about 2 to 50 µm, and more preferably about 10 to 40 µm, for example. When the cured product of an acid-modified polyolefin and a curing agent is used, the thickness of the adhesive layer 5 is preferably about 30 µm or less, more preferably about 0.1 to 20 µm, and still more preferably about 0.5 to 5 µm, for example. In the case of an adhesive agent layer formed of the adhesive composition described above, the thickness after drying is about 1 to 30 $g/m^2$, for example. When the adhesive layer 5 is the cured product of a resin composition containing an acid-modified polyolefin and a curing agent, the adhesive layer 5 can be formed by applying the resin composition, and curing the composition by heating or the like.

[Surface Coating Layer 6]

The battery packaging material of the present invention may optionally include the surface coating layer 6 on the surface of the polyester film layer 1 (opposite surface of the polyester film layer 1 facing to the aluminum alloy foil layer 3), for the purpose of enhancing the designability, electrolyte resistance, scratch resistance, and moldability, and the like. The surface coating layer 6 is a layer positioned as an outermost layer during the assembly of a battery.

The surface coating layer 6 can be formed using, for example, polyvinylidene chloride, a polyester resin, a urethane resin, an acrylic resin, or an epoxy resin. In particular, the surface coating layer 6 is preferably formed using a two-liquid curable resin. Examples of the two-liquid curable resin that forms the surface coating layer 6 include a two-liquid curable urethane resin, a two-liquid curable polyester resin, and a two-liquid curable epoxy resin. An additive may also be blended into the surface coating layer 6.

Examples of the additive include fine particles having a particle diameter of 0.5 nm to 5 µm. The material of the additive is not particularly limited, and examples thereof include metals, metal oxides, inorganic materials, and organic materials. Moreover, the shape of the additive is not particularly limited, and examples thereof include a spherical shape, a fibrous shape, a plate shape, an indefinite shape, and a balloon shape. Specific examples of the additive include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrene, crosslinked polyethylene, benzoguanamine, gold, aluminum, copper, and nickel. One kind of these additives may be adopted, or two or more kinds of these additives may be adopted in combination. Among these additives, silica, barium sulfate, and titanium oxide, for example, are preferred from the viewpoint of dispersion stability, costs, and the like. The surface of the additive may be subjected to various types of surface treatments, such as an insulation treatment and a dispersibility enhancing treatment.

Examples of the method for forming the surface coating layer 6 include, although not particularly limited to, a method in which the two-liquid curable resin for forming the surface coating layer 6 is applied to one surface of the polyester film layer 1. When an additive is to be blended, the additive may be added and mixed into the two-liquid curable resin, and then the mixture may be applied.

The thickness of the surface coating layer 6 is not particularly limited as long as it exhibits the above-described function as the surface coating layer 6, and is, for example, about 0.5 to 10 μm, and preferably about 1 to 5 μm.

3. Method for Producing Battery Packaging Material

The method for producing the battery packaging material of the present invention is not particularly limited as long as a laminate in which the layers each having a predetermined composition are laminated is obtained. That is, a method for producing the battery packaging material of the present invention includes the step of obtaining a laminate by laminating at least a polyester film layer, an aluminum alloy foil layer, and a heat-sealable resin layer, each having the thickness as described above, in this order.

One example of the method for producing the battery packaging material of the present invention is as follows. Initially, a laminate in which the polyester film layer 1, the adhesive agent layer 2, and the aluminum alloy foil layer 3 are laminated in this order (the laminate may be hereinafter referred to as the "laminate A") is formed. Specifically, the laminate A can be formed using a dry lamination method as follows: the adhesive to be used for forming the adhesive agent layer 2 is applied to the polyester film layer 1, or to the aluminum alloy foil layer 3 whose surface has been optionally subjected to a chemical conversion treatment, using a coating method such as a gravure coating method or a roll coating method, and then dried. Then, the aluminum alloy foil layer 3 or the polyester film layer 1 is laminated on the adhesive agent layer 2, and the adhesive agent layer 2 is cured.

Subsequently, the heat-sealable resin layer 4 is laminated on the aluminum alloy foil layer 3 of the laminate A. Examples of the method therefor include (1) a method in which the heat-sealable resin layer 4 is laminated on the aluminum alloy foil layer 3 of the laminate A by extrusion (extrusion lamination method); (2) a method in which the heat-sealable resin layer 4 is separately provided and laminated on the aluminum alloy foil layer 3 of the laminate A by a heat lamination method; and (3) a method in which the heat-sealable resin layer 4 is laminated on the aluminum alloy foil layer 3 of the laminate A by a thermal lamination method.

When the surface coating layer 6 is to be provided, the surface coating layer 6 is laminated on the surface of the polyester film layer 1 with the surface coating layer 6 opposing the aluminum alloy foil layer 3 across the polyester film layer 1. The surface coating layer 6 can be formed by, for example, applying the above-described resin for forming the surface coating layer 6 onto the surface of the polyester film layer 1. The order of the step of laminating the aluminum alloy foil layer 3 on the surface of the polyester film layer 1 and the step of laminating the surface coating layer 6 on the surface of the polyester film layer 1 is not particularly limited. For example, the surface coating layer 6 may be formed on the surface of the polyester film layer 1, and then the aluminum alloy foil layer 3 may be formed on the surface of the polyester film layer 1 with aluminum alloy foil layer 3 opposing the surface coating layer 6 across the polyester film layer 1.

In the manner as described above, a laminate is formed which includes the optional surface coating layer 6, the polyester film layer 1, the adhesive agent layer 2, the aluminum alloy foil layer 3 whose surface has been optionally subjected to a chemical conversion treatment, the optional adhesive layer 5, and the heat-sealable resin layer 4. The laminate may further be subjected to a heat treatment of a heat-roll contact type, a hot-air type, a near- or far-infrared radiation type, or the like in order to strengthen the adhesiveness of the adhesive agent layer 2 or the adhesive layer 5. Such a heat treatment may be performed, for example, at about 150 to 250° C. for about 1 to 5 minutes.

In the battery packaging material of the present invention, the layers that form the laminate may be optionally subjected to a surface activation treatment such as a corona treatment, a blast treatment, an oxidation treatment, or an ozone treatment, in order to improve or stabilize the film formability, lamination processing, suitability for final product secondary processing (pouching and embossing molding), and the like.

4. Use of Battery Packaging Material and Battery

The battery packaging material of the present invention is usable for a package for hermetically sealing and storing battery elements such as a positive electrode, a negative electrode, and an electrolyte. That is, the battery of the present invention can be provided by storing a battery element including at least a positive electrode, a negative electrode, and an electrolyte in a package formed of the battery packaging material of the present invention.

More specifically, the battery of the present invention includes a battery element including at least a positive electrode, a negative electrode, and an electrolyte, a package for sealing the battery element, and a metal terminal electrically connected to each of the positive electrode and the negative electrode and protruding to the outside of the package, and in this battery, the package is formed of the battery packaging material of the present invention described above. An adhesive film exists between the metal terminal and the package. In the manufacture of the battery of the present invention, using the battery packaging material of the present invention, the battery element is covered such that a flange portion (region where a pair of the heat-sealable resin layers are in contact with each other) can be formed on the periphery of the battery element, with the metal terminal connected to each of the positive electrode and the negative electrode protruding to the outside, and the pair of the heat-sealable resin layers at the flange portion are heat-sealed to each other and hermetically sealed to provide a battery. At this time, between the heat-sealable resin layers, as shown in the schematic diagram of FIG. 4, the metal terminal 11 and an adhesive film 12 for improving the adhesiveness between the metal terminal 11 and the heat-sealable resin layer 4 are interposed.

The metal terminal 11 (*tab*) is a conductive member electrically connected to the electrode (positive electrode or negative electrode) of the battery element and is formed of a metal material. The metal material forming the metal terminal is not particularly limited, and examples thereof include aluminum, nickel, and copper. For example, a metal terminal connected to a positive electrode of a lithium ion battery is usually formed of aluminum or the like. A metal terminal connected to a negative electrode of the lithium ion battery is usually formed of copper, nickel, or the like.

The adhesive film 12 is arranged between the metal terminal 11 electrically connected to the electrode of the battery element and the package sealing the battery element. The metal terminal 11 protrudes to the outside of the battery packaging material (package), and is held by the battery packaging material with the adhesive film 12 interposed therebetween at a peripheral edge portion of the heat-sealed battery packaging material. The heating temperature at the time of heat-sealing the battery packaging material is usually in a range of about 160 to 190° C., and the pressure is usually in a range of about 1.0 to 2.0 MPa.

The adhesive film is provided to improve the adhesion between the metal terminal and the battery packaging material. By improving the adhesion between the metal terminal and the battery packaging material, a performance of sealing the battery element is improved. When the battery element is heat-sealed, the battery element is sealed such that the metal terminal electrically connected to the electrode of the battery element protrudes to the outside of the battery packaging material. At this time, since the metal terminal formed of metal and the heat-sealable resin layer located in the innermost layer of the battery packaging material are formed of different types of materials, when such an adhesive film is not used, the performance of sealing the battery element tends to be low at an interface between the metal terminal and the heat-sealable resin layer.

The configuration of the adhesive film is not particularly limited and may be a known one. For example, preferred is an adhesive film in which a first polyolefin layer, a base film, and a second polyolefin layer are sequentially provided, and at least one of the first polyolefin layer and the second polyolefin layer is formed of acid-modified polyolefin. In the adhesive film, the first polyolefin layer and the second polyolefin layer are respectively located on the surfaces on both sides, and when the adhesive film is arranged between the metal terminal of the battery and the battery packaging material, the surface of the metal terminal formed from metal and the heat-sealable resin layer 4 of the battery packaging material are adhered together through the adhesive film.

Figure 1:
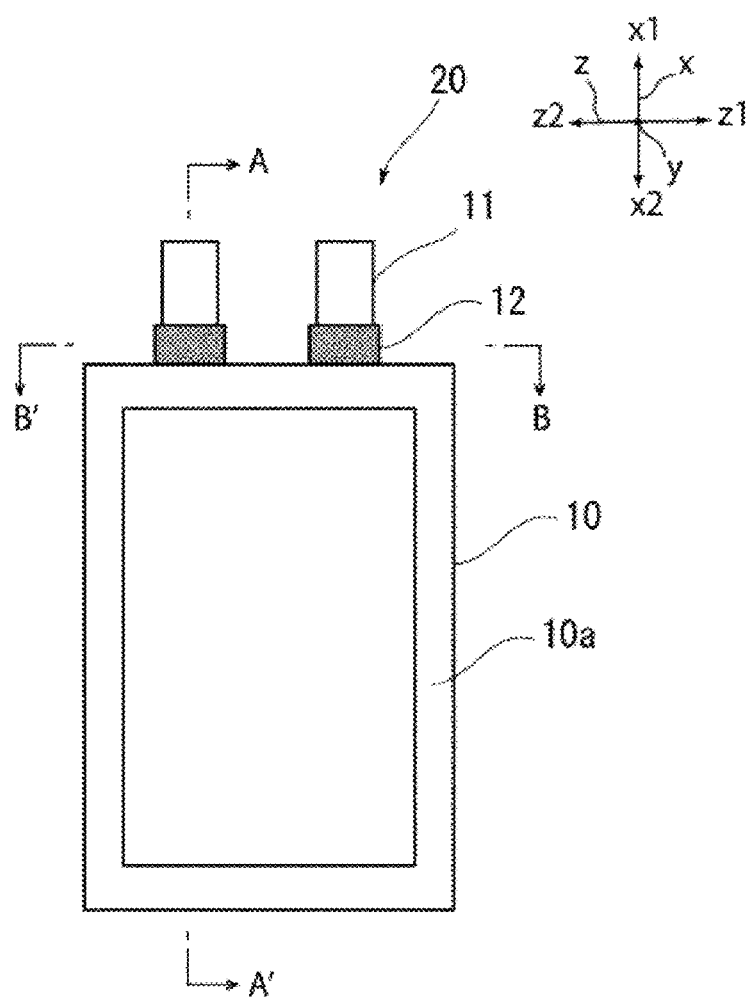
FIG. 1 is a schematic plan view of a battery of the present invention.
Figure 2:
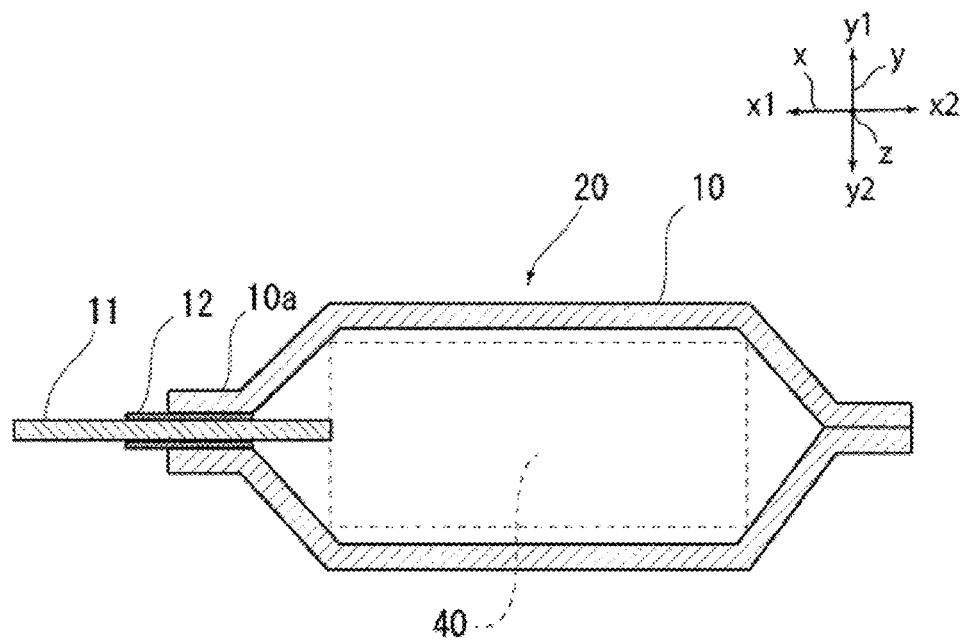
FIG. 2 is a schematic sectional view taken along the line A-A' in FIG. 1.
Figure 3:
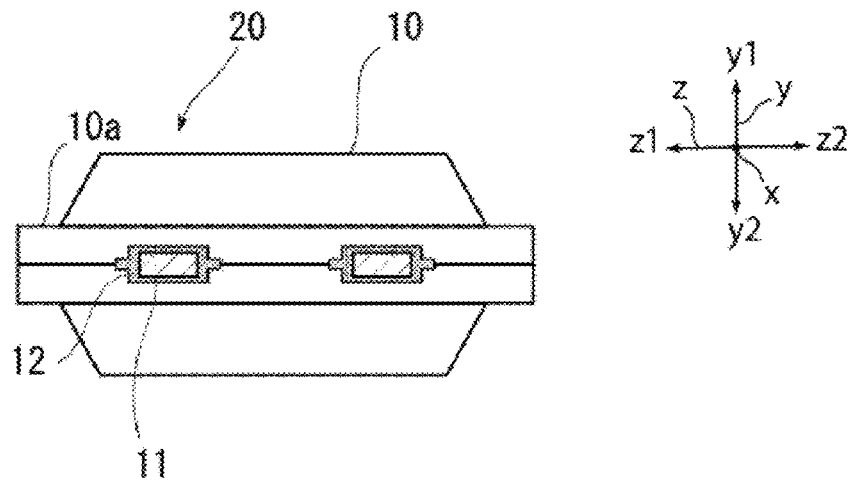
FIG. 3 is a schematic sectional view taken along the line B-B' in FIG. 1.
Figure 4:
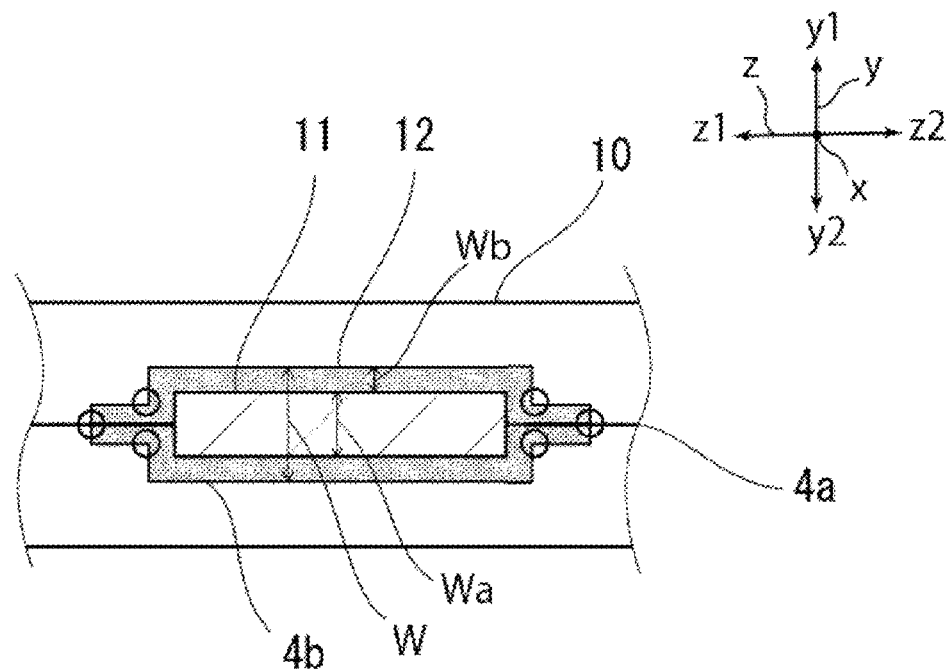
FIG. 4 is an enlarged view of a portion where a metal terminal and an adhesive film are located in the schematic sectional view of FIG. 3.

As described above, in the battery packaging material of the present invention, curling is suppressed, sufficient surface insulating properties can be imparted to the battery, and, in addition, leakage of the electrolyte of the battery can be effectively suppressed. Thus, the battery packaging material of the present invention can be suitably usable for a large battery such as a vehicle battery. For example, in a battery, as shown in FIG. 4, a thickness Wa of the metal terminal 11 may be as large as 100 μm or more in a thickness direction y of the package (formed of the battery packaging material 10). The thickness Wa of the metal terminal 11 is, for example, about 100 to 500 μm, about 200 to 500 μm, about 300 to 500 μm, about 100 to 400 μm, about 200 to 400 μm, or about 300 to 400 μm. The length of the metal terminal 11 is, for example, about 30 to 90 mm, and the width is, for example, about 40 to 100 mm.

In the battery of the present invention, a thickness Wb of the adhesive film 12 in the thickness direction y of the package may be, for example, 70 μm or more, 80 μm or more, or 100 μm or more. The thickness Wb of the adhesive film is preferably about 70 to 130 μm, about 80 to 130 μm, about 100 to 130 μm, about 70 to 120 μm, about 80 to 120 μm, or about 100 to 120 μm, for example. For example, in FIG. 4, since there are two layers of the adhesive films 12, a total of the thickness Wb of the adhesive film in the thickness direction y of the package is Wb×2.

The battery of the present invention may be either a primary battery or a secondary battery, and is preferably a secondary battery. The type of a secondary battery is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred secondary batteries to which the battery packaging material of the present invention is applied include lithium ion batteries and lithium ion polymer batteries.

In particular, in the battery packaging material of the present invention, curling is also suppressed, sufficient surface insulating properties can be imparted to the battery, and, in addition, leakage of the electrolyte of the battery can be effectively suppressed, so that the battery packaging material can be suitably usable for a large battery such as a vehicle battery. In particular, as a battery to which the battery packaging material of the present invention can be suitably applied, a large battery having a battery capacity of 30 Ah or more can be mentioned. The battery packaging material of the present invention can be suitably usable for a battery used in a module in which a plurality of batteries are arranged.

EXAMPLES

Hereinafter, the present invention will be described in detail with reference to Examples and Comparative Examples. However, the present invention is not limited to Examples.

Examples 1 to 33 and Comparative Examples 1 to 10

<Manufacture of Battery Packaging Material>

In each Example, an aluminum alloy foil as an aluminum alloy foil (JIS H4160:1994 A8021H-O) having both surfaces subjected to a chemical conversion treatment was laminated by a dry lamination method on a base substrate layer formed from a resin film shown in Table 1 (PET (stretched polyethylene terephthalate film) or ONy (stretched nylon film)). Specifically, a two-component urethane adhesive (a polyol compound and an aromatic isocyanate compound) was applied to one surface of the aluminum alloy foil to form an adhesive agent layer (thickness: 3 μm) on the aluminum alloy foil layer. Subsequently, the adhesive agent layer on the aluminum alloy foil and the base substrate layer were laminated, and then subjected to 24-hour aging treatment at 40° C. to prepare a laminate having the base substrate layer, the adhesive agent layer, and the aluminum alloy foil layer. The chemical conversion treatment of the aluminum alloy foil was performed by applying a treatment solution containing a phenol resin, a chromium fluoride compound, and phosphoric acid to both surfaces of the aluminum alloy foil using a roll coating method such that the amount of chromium applied became 10 mg/m$^2$ (dry mass) followed by baking.

Next, acid-modified polypropylene and random polypropylene as the heat-sealable resin layer were melt-extruded on the aluminum alloy foil layer of the obtained laminate to laminate the heat-sealable resin layer on the aluminum alloy foil layer. Next, the obtained laminate was aged to obtain a battery packaging material in which the base substrate layer, the adhesive agent layer, the aluminum alloy foil layer, and the heat-sealable resin layer were laminated in this order. The thickness of each layer of the battery packaging material is as shown in Table 1.

The acid-modified polypropylene and the random polypropylene of the heat-sealable resin layer have the same thickness, and Table 1 shows the thickness of the heat-sealable resin layer. As the random polypropylene for the heat-sealable resin layer, in Examples 8 to 11 and Comparative Example 9, random polypropylenes different from those in Examples 1 to 7 and 12 to 33 and Comparative Examples 1 to 8 and 10 are used, and the logarithmic decrement ΔE, which will be described later, is different as shown in Table 1. In Table 1, for the random polypropylene having a logarithmic decrement ΔE of 0.04, one in which the MFR (melt mass flow rate) at 230° C. was 11 g/cm$^3$ was used. For the random polypropylene having a logarithmic decrement ΔE of 0.03, one in which the MFR at 230° C. was 7 g/cm$^3$ was used (*1 of Table 1). For the random polypropylene having a logarithmic decrement ΔE of 0.02, one in which the MFR at 230° C. was 5 g/cm$^3$ was used (*2 of Table 1). For the random polypropylene having a logarithmic decrement ΔE of 0.05, one in which the MFR at 230° C. was 15 g/cm$^3$ was used (*3 of Table 1). For the random polypropylene having a logarithmic decrement ΔE of 0.07, one in which the MFR at 230° C. was 19 g/cm$^3$ was used (*4 of Table 1). The same resin was used as the acid-modified polypropylene in all the Examples and Comparative Examples.

The maleic anhydride-modified polypropylenes used for the heat-sealable resin layers in Examples 1 and 33 were different from each other and had the logarithmic decrements ΔE at 120° C. as shown in Table 2 (values measured with a rigid-body pendulum-type physical property tester). In the heat-sealable resin layer, the amount of the low-molecular-weight component in the polypropylene was adjusted to adjust the value ($T_2/T_1$) obtained by dividing, by the temperature difference $T_1$, the temperature difference $T_2$ between the onset point (extrapolation melting onset temperature) and the termination point (extrapolation melting termination temperature) of the melting peak temperature of the heat-sealable resin layer, measured using the methods described below.

In each battery packaging material, 7 mg/m$^2$ of erucic acid amide was applied to the surface of the resin film as the base substrate layer, and 10 mg/m$^2$ of erucic acid amide was applied to the surface of the heat-sealable resin layer.

<Measurement of Logarithmic Decrement ΔE of Surface on Heat-Sealable Resin Layer Side of Laminate>

Each of the battery packaging materials obtained above was cut into a rectangle having a width (TD: Transverse Direction) of 15 mm×a length (MD: Machine Direction) of 50 mm to obtain test samples. The MD of the battery packaging material corresponds to the rolling direction (RD) of the aluminum alloy foil, the TD of the battery packaging material corresponds to the TD of the aluminum alloy foil, and the rolling direction (RD) of the aluminum alloy foil can be specified by rolling marks. When the MD of the battery packaging material cannot be specified by rolling marks of the aluminum alloy foil, the MD can be specified by the following method. As a method of confirming the MD of the battery packaging material, a sea-island structure is confirmed by observing the cross section of the heat-sealable resin layer of the battery packaging material with an electron microscope, and a direction parallel to a cross section where an average of the diameter of the shape of the island in a direction perpendicular to the thickness direction of the heat-sealable resin layer is maximum can be judged as the MD. Specifically, the angle of the cross section of the heat-sealable resin layer in one direction is varied by 10 degrees from the direction parallel to the cross section in the one direction, and each of cross sections (a total of ten cross sections) from the direction parallel to the cross section in one direction to the direction perpendicular to the cross section in the one direction is observed by electron microscope to identify a sea-island structure. Next, the shape of each individual island is observed in each cross section. With respect to the shape of individual island, a diameter y is defined as a linear distance connecting its leftmost and rightmost ends in a direction perpendicular to the thickness direction of the heat-sealable resin layer. In each cross section, an average value of the diameter y of top 20 islands in decreasing order of the diameter y of the island shape is calculated. A direction parallel to the cross section where the average of the diameter y of the island shape is the largest is judged as the MD. A rigid-body pendulum physical property tester (model: RPT-3000W from A&D Company, Limited) was used, FRB-100 was used as a frame of a pendulum, RBP-060 was used as a cylindrical edge of an edge portion, and CHB-100 was used as a cooling/heating block. Additionally, the vibration displacement detector 32 and the weight 33 were used, and an initial amplitude was set to about 0.3 degrees. First, a test sample was placed on the cooling/heating block with the measurement surface (heat-sealable resin layer) facing upward, and the cylindrical edge equipped with the pendulum was mounted on the measurement surface such that the axial direction became orthogonal to the MD direction of the test sample and the cylindrical edge was in contact with the surface of the heat-sealable resin layer. In order to prevent floating or warping of the test sample during measurement, the test sample is fixed on the cooling/heating block by applying a Kapton tape to its regions that did not affect the measurement results. Next, using the cooling/heating block, the logarithmic decrement ΔE of the surface of the heat-sealable resin layer was measured in the temperature range of 30° C. to 200° C. at a temperature elevation rate of 3° C./min. The logarithmic decrement ΔE in the state where the surface temperature of the heat-sealable resin layer of the test sample had reached 80° C. was adopted. After measured once, the test sample was not used again, and a new test sample prepared by cutting was used. The average value of three measurements (N=3) was adopted. The results are shown in Table 1.

<Measurement of Insulation Breakdown Voltage>

For each of the battery packaging materials obtained above, the insulation breakdown voltage (AC, 50 Hz) of the base substrate layer was measured in accordance with the conditions as defined in JIS C2110-1. A test piece had a length of 100 mm and a width of 100 mm. An average value of the number of measurements n=3 was used. Details of the test conditions are as follows. The results are shown in Table 1.

(Test Conditions)
Pressure boosting method: short-time method
Ambient medium: air (23° C.)
Pressure boosting rate: 0.5 kV/sec
Test electrode: column-type electrode with diameter of 25 mm/column-type electrode with diameter of 25 mm
Number of measurements: n=3
Test environment: 23° C.±2° C., 50±5% RH <Evaluation of Suppression of Electrolyte Leakage>

Each of the battery packaging materials obtained above was cut into a rectangle having a size of 100 mm in width (TD)×200 mm in length (MD) to prepare test samples. As shown in the schematic diagram of FIG. 4, a metal terminal equipped with an adhesive film (width: 50 mm, length: 30 mm, thickness: W 0.5 mm (W=Wa+2Wb=0.3 mm+2×0.1 mm)) was provided in which the adhesive films 12 (thickness: Wb=0.1 mm, a laminate having acid-modified polypropylene (44 μm), polyethylene naphthalate (12 μm), acid-modified polypropylene (44 μm)) were previously adhered to both surfaces of the metal terminal 11 (made of aluminum, thickness: Wa=0.3 mm). Each test sample was folded in two in the lengthwise direction with the heat-sealable resin layer of the test sample facing inside, the metal terminal equipped with an adhesive film was inserted into the side opposite from the folded side, and heat sealing was performed such that an adhesive film portion and the test sample overlapped (temperature: 190° C., time: 3.0 seconds, surface pressure: 1.0 MPa). Next, one of the two non-heat-sealed sides of the test sample was heat-sealed to form a bag shape under the same conditions above. Next, 1 g of a red penetrant (from Mitsubishi Gas Chemical Company, Inc., Ageless Seal Check) was put through an opening of the bag-shaped test sample, the opening was heat-sealed under the same conditions, and the penetrant was hermetically sealed with the bag-shaped test sample. Then, the test sample was held such that the metal terminal equipped with an adhesive film was directed downward, and the test sample was allowed to stand in an environment of a temperature of 25° C. and a relative humidity of 50%. After 1 hour, the presence/absence of leakage of the penetrant in a seal portion of the test sample was confirmed. Next, the test sample in which no leakage occurred was allowed to stand in an environment of a temperature of 60° C. and a relative humidity of 90%, and, 90 days later, the presence/absence of leakage of the penetrant in the seal portion of the test sample was confirmed. According to the following evaluation criteria, the electrolyte leakage suppression effect in a high-temperature and high-humidity environment was evaluated. The results are shown in Table 1.

(Evaluation Criteria)

AA: No leakage of the penetrant occurs even after standing for 90 days in the environment of a temperature of 60° C. and a relative humidity of 90%, and electrolyte leakage is extremely unlikely to occur.

A: No leakage of the penetrant occurs even after standing for 1 hour in an environment of a temperature of 25° C. and a relative humidity of 50%. However, the leakage of the penetrant occurs after standing for 90 days in the environment of a temperature of 60° C. and a relative humidity of 90%, and electrolyte leakage is unlikely to occur.

C: The leakage of the penetrant occurs after standing for 1 hour in the environment of a temperature of 25° C. and a relative humidity of 50%, and electrolyte leakage is likely to occur.

<Evaluation of Moldability>

Each of the battery packaging materials obtained above was cut into a rectangle having a width (TD) of 80 mm×a length (MD) of 120 mm to prepare samples. In an environment of a temperature of 24° C. and relative humidity 50%, these samples were molded (draw-in one-step molding) by increasing a molding depth in 0.5 mm increments from a molding depth of 0.5 mm at a pressing pressure of 0.4 MPa, using a molding die (female mold, surface: a maximum height roughness (nominal value of Rz) of 3.2 μm that was specified in Table 2 of JIS B 0659-1: 2002, Annex 1 (reference), Standard Surface Roughness Piece for Comparison) having an opening size of 30 mm×50 mm and a corresponding molding die (male mold, surface: a maximum height roughness (nominal value of Rz) of 1.6 μm that was specified in Table 2 of JIS B 0659-1: 2002, Annex 1 (reference), Standard Surface Roughness Piece for Comparison). Each molded sample was exposed to light with a penlight in a dark room, and whether or not pinholes or cracks were generated in an aluminum alloy foil was confirmed by light transmission. The molding depth smaller by 0.5 mm than the molding depth at which pinholes or cracks occurred in the battery packaging material was defined as a limited molding depth of the sample. The moldability of the battery packaging material was evaluated based on this limit molding depth, using the following criteria. The results are shown in Table 1.

(Evaluation Criteria)

A: The limit molding depth was 6.0 mm or more.

B: The limit molding depth was 5.0 mm or more and 5.5 mm or less.

C: The limit molding depth was 4.0 mm or more and 4.5 mm or less.

D: The limit molding depth was 3.5 mm or less.

<Evaluation of Curling>

Each of the battery packaging materials (width (TD) 200 mm×length (MD) 300 m) obtained above was wound into a roll shape around a cylindrical winding core (circular cross-section inner diameter: 76 mm, outer diameter: 86 mm) in the lengthwise direction to obtain a winding body. At this time, the battery packaging material was wound so that the heat-sealable resin layer of the battery packaging material was located inside. For example, in the case of the battery packaging material of Example 1 having a total thickness of 143 μm, the circular cross-section diameter of the winding body (including the circular cross-section diameter of the winding core) is 249 mm. The obtained winding body was allowed to stand for 24 hours in an environment of a temperature of 25° C. and a relative humidity of 50%. Next, the battery packaging material was unwound from the winding body, and five rectangular test samples (width: 150 mm, length: 90 mm) were obtained by cutting at predetermined intervals in the lengthwise direction so as to include the center portion in the width direction of the rewound battery packaging material, and two 100 mm long incisions were made on the diagonal of each test sample. This created four vertices at the center of the test sample. Next, the test sample was allowed to stand for 8 hours or more in a dry room environment of a temperature of 25° C. and a dew point of −20° C. or lower. The test sample was then placed on a horizontal plane with the four vertices of the curled test sample facing up. In Comparative Example 8, curling occurred on the base substrate layer side, so that the test sample was placed such that the heat-sealable resin layer was located on the horizontal plane side. In Examples 1 to 33 and Comparative Examples 1 to 7, 9 and 10, curling occurred on the heat-sealable resin layer side, so that the test sample was placed such that the base substrate layer was located on the horizontal plane side. For each of the four vertex portions formed by cutting the test sample to make incisions, the shortest distance from the horizontal plane (distance in the vertically upward direction from the horizontal plane) was measured, the maximum value of the four shortest distances was taken as the curl amount of each of them, and the average value of the curl amounts of five test samples was taken as the curl amount tin the test sample. The evaluation criteria of the curl amount are as follows.

(Evaluation Criteria)

A: Curl amount t=0 mm or more and less than 10 mm, curling is small, and productivity hardly decreases.

B: Curl amount t=10 mm or more and less than 20 mm, although curling is slightly large, and the decrease in productivity is small.

C: Curl amount t=20 mm or more and less than 30 mm, curling is large, and the decrease in productivity is large.

D: Curl amount t=30 mm or more, curling is very large, and the decrease in productivity is very large.

TABLE 1

| | Base material layer | | Aluminum alloy foil | Thermally-weldable resin layer | Total thickness of battery packaging material (μm) | Logarithmic decrement ΔE of thermally-weldable resin layer surface | Insulation breakdown voltage of base material layer-side surface (KV) | Suppression of electrolyte leakage | Suppression of curling | Moldability |
|---|---|---|---|---|---|---|---|---|---|---|
| | Type | Thickness (μm) | Thickness (μm) | Thickness (μm) | | | | | | |
| Example 1 | PET | 25 | 35 | 80 | 143 | 0.04 | 14 | AA | A | A |
| Example 2 | PET | 25 | 35 | 70 | 133 | 0.04 | 14 | A | A | A |
| Example 3 | PET | 25 | 35 | 90 | 153 | 0.04 | 14 | AA | A | A |
| Example 4 | PET | 25 | 35 | 100 | 163 | 0.04 | 14 | AA | B | A |
| Example 5 | PET | 25 | 30 | 100 | 158 | 0.04 | 14 | AA | B | A |
| Example 6 | PET | 25 | 30 | 80 | 138 | 0.04 | 14 | AA | B | A |
| Example 7 | PET | 25 | 40 | 80 | 148 | 0.04 | 14 | AA | A | A |
| Example 8 | PET | 25 | 35 | 80*1 | 143 | 0.03 | 14 | A | B | A |
| Example 9 | PET | 25 | 35 | 80*2 | 143 | 0.02 | 14 | A | B | A |
| Example 10 | PET | 25 | 35 | 80*3 | 143 | 0.05 | 14 | AA | A | A |
| Example 11 | PET | 25 | 35 | 80*4 | 143 | 0.07 | 14 | AA | A | A |
| Example 12 | PET | 23 | 37 | 85 | 148 | 0.04 | 13 | AA | A | A |
| Example 13 | PET | 25 | 37 | 85 | 150 | 0.04 | 14 | AA | A | A |
| Example 14 | PET | 27 | 37 | 85 | 152 | 0.04 | 15 | AA | A | A |
| Example 15 | PET | 23 | 35 | 85 | 146 | 0.04 | 13 | AA | A | A |
| Example 16 | PET | 25 | 35 | 85 | 148 | 0.04 | 14 | AA | A | A |
| Example 17 | PET | 27 | 35 | 85 | 150 | 0.04 | 15 | AA | A | A |
| Example 18 | PET | 23 | 37 | 85 | 148 | 0.04 | 13 | AA | A | A |
| Example 19 | PET | 23 | 37 | 80 | 143 | 0.04 | 13 | AA | A | A |
| Example 20 | PET | 25 | 37 | 80 | 145 | 0.04 | 14 | AA | A | A |
| Example 21 | PET | 27 | 37 | 80 | 147 | 0.04 | 15 | AA | A | A |
| Example 22 | PET | 23 | 35 | 80 | 141 | 0.04 | 13 | AA | A | A |
| Example 23 | PET | 27 | 35 | 80 | 145 | 0.04 | 15 | AA | A | A |
| Example 24 | PET | 23 | 37 | 80 | 143 | 0.04 | 13 | AA | A | A |
| Example 25 | PET | 23 | 37 | 75 | 138 | 0.04 | 13 | AA | A | A |
| Example 26 | PET | 25 | 37 | 75 | 140 | 0.04 | 14 | AA | A | A |
| Example 27 | PET | 27 | 37 | 75 | 142 | 0.04 | 15 | AA | A | A |
| Example 28 | PET | 23 | 35 | 75 | 136 | 0.04 | 13 | AA | A | A |
| Example 29 | PET | 25 | 35 | 75 | 138 | 0.04 | 14 | AA | A | A |
| Example 30 | PET | 27 | 35 | 75 | 140 | 0.04 | 15 | AA | A | A |
| Example 31 | PET | 23 | 37 | 75 | 138 | 0.04 | 13 | AA | A | A |
| Example 32 | PET | 25 | 37 | 75 | 140 | 0.04 | 14 | AA | A | A |
| Example 33 | PET | 25 | 35 | 80 | 143 | 0.04 | 14 | AA | A | A |
| Comparative Example 1 | PET | 25 | 35 | 60 | 123 | 0.04 | 14 | C | A | A |
| Comparative Example 2 | PET | 25 | 35 | 110 | 173 | 0.04 | 14 | AA | D | A |
| Comparative Example 3 | PET | 25 | 25 | 80 | 133 | 0.04 | 14 | AA | C | D |
| Comparative Example 4 | PET | 5 | 35 | 80 | 123 | 0.04 | 1 | AA | C | B |
| Comparative Example 5 | PET | 9 | 35 | 80 | 127 | 0.04 | 4 | AA | B | B |
| Comparative Example 6 | PET | 12 | 35 | 80 | 130 | 0.04 | 7 | AA | A | B |
| Comparative Example 7 | PET | 16 | 35 | 80 | 134 | 0.04 | 9 | AA | A | B |
| Comparative Example 8 | PET | 50 | 35 | 80 | 168 | 0.04 | 32 | AA | D | A |
| Comparative Example 9 | ONy | 15 | 35 | 80*2 | 133 | 0.02 | 3 | A | A | A |
| Comparative Example 10 | ONy | 15 | 35 | 80 | 133 | 0.04 | 3 | AA | A | A |

As described above, as the random polypropylene for the heat-sealable resin layer, in Examples 8 to 11 and Comparative Example 9, the random polypropylenes different from those in Examples 1 to 7 and 12 to 33 and Comparative Examples 1 to 8 and 10 are used, and the logarithmic decrement ΔE is different.

In Table 1, PET is a stretched polyethylene terephthalate film and ONy is a stretched nylon film.

As is clear from the results shown in Table 1, in the battery packaging material configured from a laminate in which, at least, a polyester film layer, an aluminum alloy foil layer, and a heat-sealable resin layer are laminated in this order, it can be seen that in the battery packaging materials of Examples 1 to 33 having specific configuration and thickness that the thickness of the polyester film layer is 23 μm or more and 27 or less, the thickness of the aluminum alloy foil layer is 27 μm or more and 43 μm or less, and the thickness of the heat-sealable resin layer is 70 μm or more and 100 μm or less, the battery packaging materials have high surface insulating properties in which the dielectric breakdown voltage of the surface on the polyester film layer side is 13 kV or more, curling of the battery packaging materials is suppressed, a gap is hardly generated between the heat-sealable resin layer and the adhesive film because of heat sealing, and leakage of an electrolyte is effectively suppressed. On the other hand, it can be seen that Comparative Examples 1 to 10 are inferior to Examples 1 to 33 in at least one of the evaluations of surface insulating properties, suppression of curling, and electrolyte leakage, and do not exhibit excellent characteristics at the same time in all evaluation items.

<Measurement of Logarithmic Decrement ΔE on Aluminum Alloy Foil Layer Side of Heat-Sealable Resin Layer>

Each of the battery packaging materials of Examples 1 and 33 obtained above was cut into a rectangle having a width (TD: Transverse Direction) of 15 mm×a length (MD: Machine Direction) of 150 mm to obtain a test sample (battery packaging material 10). The MD of the battery packaging material corresponds to a rolling direction (RD) of the aluminum alloy foil, the TD of the battery packaging material corresponds to the TD of the aluminum alloy foil, and the rolling direction (RD) of the aluminum alloy foil can be identified by rolling marks. When the MD of the battery packaging material cannot be specified by rolling marks of the aluminum alloy foil, the MD can be specified by the following method. As a method of confirming the MD of the battery packaging material, a sea-island structure is confirmed by observing the cross section of the heat-sealable resin layer of the battery packaging material with an electron microscope, and a direction parallel to a cross section where an average of the diameter of the shape of the island in a direction perpendicular to the thickness direction of the heat-sealable resin layer is maximum can be judged as the MD. Specifically, the angle of the cross section of the heat-sealable resin layer in the lengthwise direction is varied by 10 degrees from the direction parallel to the cross section in the lengthwise direction, and each of cross sections (a total of ten cross sections) from the direction parallel to the cross section in the lengthwise direction to the direction perpendicular to the cross section in the lengthwise direction is observed by electron microscope to identify a sea-island structure. Next, the shape of each individual island is observed in each cross section. With respect to the shape of individual island, a diameter y is defined as a linear distance connecting its leftmost and rightmost ends in a direction perpendicular to the thickness direction of the heat-sealable resin layer. In each cross section, an average value of the diameter y of top 20 islands in decreasing order of the diameter y of the island shape is calculated. A direction parallel to the cross section where the average of the diameter y of the island shape is the largest is judged as the MD. FIG. 8 shows a schematic diagram for explaining a method of measuring the logarithmic decrement ΔE by the rigid-body pendulum measurement. A rigid-body pendulum-type physical property tester (model: RPT-3000W from A&D Company, Limited) was used, FRB-100 was used as the frame of the pendulum 30, RBP-060 was used as the cylindrical edge 30a of the edge portion, and CHB-100 was used as the cooling/heating block 31. Additionally, the vibration displacement detector 32 and the weight 33 were used, and the initial amplitude was set to about 0.3 degrees. The test sample was placed on the cooling/heating block 31, with the measurement surface (heat-sealable resin layer (acid-modified polypropylene)) of the test sample facing upward, and the cylindrical edge 30a equipped with the pendulum 30 was mounted on the measurement surface such that the axial direction became orthogonal to the MD direction of the test sample. In order to prevent floating or warping of the test sample during measurement, the test sample is fixed on the cooling/heating block 31 by applying a Kapton tape to its regions that did not affect the measurement results. The cylindrical edge was brought into contact with the surface of the heat-sealable resin layer. Next, using the cooling/heating block 31, the logarithmic decrement ΔE of the heat-sealable resin layer was measured in the temperature range of 30° C. to 200° C. at a temperature elevation rate of 3° C./min. The logarithmic decrement ΔE in a state where the surface temperature of the heat-sealable resin layer of the test sample (battery packaging material 10) had reached 120° C. was adopted. (After measured once, the test sample was not used again, and a new test sample prepared by cutting was used. The average value of three measurements (N=3) was adopted.) As for the heat-sealable resin layer, each of the battery packaging materials of Examples 1 and 33 obtained above was immersed in 15% hydrochloric acid to dissolve the polyester film layer and the aluminum alloy foil layer, and the test sample having the heat-sealable resin layer only was sufficiently dried, and then subjected to measurement of the logarithmic decrement ΔE. Table 2 shows the logarithmic decrement ΔE at 120° C. of each adhesive layer. The logarithmic decrement ΔE is calculated by the following formula:

$$\Delta E=[\ln(A1/A2)+\ln(A2/A3)+\ldots+\ln(An/An+1)]/n$$

A: Amplitude n: Wavenumber

<Measurement of Thickness Remaining Ratio of Heat-Sealable Resin Layer>

Each of the battery packaging materials of Examples 1 and 33 obtained above was cut into a size of 150 mm in length×60 mm in width to prepare test samples (battery packaging material 10). Next, the heat-sealable resin layer of the test samples having the same size as above prepared from the same battery packaging material were opposed to each other. Next, in this state, using a metal plate having a width of 7 mm, the heat-sealable resin layers were heated and pressed in the laminating direction from both sides of the test samples, at a temperature of 190° C. and a surface pressure (0.5 MPa) shown in Table 2, for a time of 3 seconds, so that the heat-sealable resin layers were thermally welded to each other. Next, the thermally-welded portion of the test sample was cut in the laminating direction using a microtome, and the thickness of the two heat-sealable resin layers thermally welded to each other was measured for the exposed cross section. Similarly, the test samples before thermal welding were cut in the laminating direction using a microtome, and the thicknesses of the two heat-sealable resin layers were measured for the exposed cross section. The ratio of the total thickness of the two heat-sealable resin layers after thermal welding, relative to the total thickness of the two heat-sealable resin layers before thermal welding, was calculated to measure the remaining ratio (%) of the total thickness of the two heat-sealable resin layers. The results are shown in Table 2.

<Measurement of Seal Strength in 25° C. Environment or 140° C. Environment>

Figure 9:
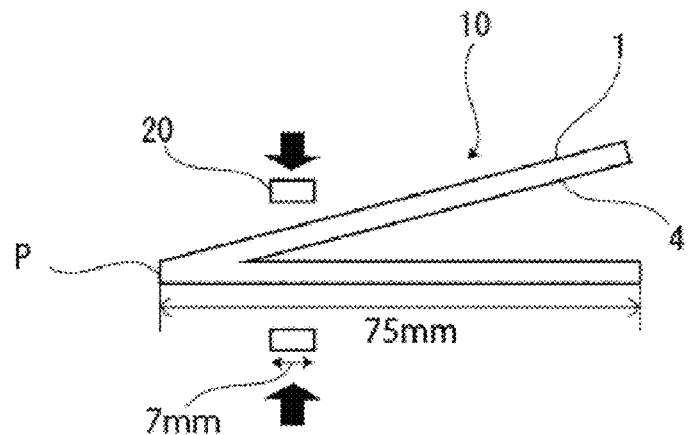
FIG. 9 is a schematic diagram for explaining a method of measuring seal strength.

Each of the battery packaging materials of Examples 1 and 33 obtained above was cut into a rectangle having a width (TD direction) of 60 mm×a length (MD direction) of 150 mm to prepare a test sample (battery packaging material 10). Next, as shown in FIG. 9, the test sample was folded over in the MD direction at the center P in the lengthwise direction, so that the heat-sealable resin layer of the sample faced to each other. Next, using the metal plate 20 having a width of 7 mm, at a surface pressure of 1.0 MPa and a temperature of 190° C. for a time of 1 second, the heat-sealable resin layers were thermally welded to each other over 7 mm (width of the metal plate) in the lengthwise direction of the test sample, across the entire width (i.e., 60 mm) inside in the MD direction by about 10 mm away from the fold P. Next, as shown in FIG. 10, the test sample was cut into a width of 15 mm, using a two-edged sample cutter. In FIG. 10, the thermally-welded region is indicated by S. Next, as shown in FIG. 11, in the form of T-peel, using a tensile testing machine (AGS-Xplus (trade name) from Shimadzu Corporation), the thermally-welded interface was peeled at a tensile rate of 300 mm/min, a peel angle of 180°, and a distance between chucks of 50 mm, in an environment at a temperature of 25° C. or 140° C., and the maximum value of the peeling strength (N/15 mm) during a time of 1.5 seconds from the start of measuring the tensile strength was determined as the seal strength in the 25° C. environment or the seal strength in the 140° C. environment. The tensile test at each temperature was performed in a constant temperature bath. In the constant temperature bath whose temperature had reached a predetermined temperature, the test sample was attached to a chuck and held for 2 minutes, and then measurement was started. Each seal strength was determined as the average value (n=3) of measurements of three test samples similarly prepared. The results are shown in Table 2.

heat-sealable resin layers are thermally welded to each other, and high seal strength can be achieved in a high-temperature environment. Furthermore, in the battery packaging material of Example 1, the logarithmic decrement ΔE is 0.20 or less, and it can be seen that crushing is more effectively suppressed when the heat-sealable resin layers are thermally welded to each other, and higher seal strength can be achieved in a high-temperature environment.

<Measurement of Extrapolation Melting Onset Temperature and Extrapolation Melting Termination Temperature of Melting Peak Temperature>

For the polypropylene used for the heat-sealable resin layer of each of the above-described battery packaging materials of Examples 1 and 33, using the following methods, the extrapolation melting onset temperature and the extrapolation melting termination temperature of the melting peak temperature were measured, and then the temperature differences $T_1$ and $T_2$ between the extrapolation melting onset temperature and the extrapolation melting termination temperature were measured. Then, based on the obtained values of the temperature differences $T_1$ and $T_2$, the ratio $(T_2/T_1)$ between these values and the absolute value $|T_2-T_1|$ of the difference between these values were calculated. The results are shown in Table 3.

(Measurement of Temperature Difference $T_1$)

In accordance with the conditions as defined in JIS K 7121:2012, using differential scanning calorimetry (DSC), a DSC curve was obtained for polypropylene used for the heat-sealable resin layer of each of the above-described battery packaging materials of Examples 1 and 33. The temperature difference $T_1$ between the extrapolation melting onset temperature and the extrapolation melting termination temperature of the melting peak temperature of the heat-sealable resin layer was measured from the obtained DSC curve.

(Measurement of Temperature Difference $T_2$)

In an environment of a temperature of 85° C., the polypropylene used for the heat-sealable resin layer was allowed to stand for 72 hours in the electrolyte which was the solution in which the concentration of lithium hexafluorophosphate was 1 mol/l and the volume ratio of ethylene carbonate, diethyl carbonate and dimethyl carbonate was 1:1:1, and then sufficiently dried. Next, in accordance with the conditions as defined in JIS K 7121:2012, using differential scanning calorimetry (DSC), a DSC curve was obtained for polypropylene after drying. Next, the temperature difference $T_2$ between the extrapolation melting onset temperature and the extrapolation melting termination tem-

TABLE 2

| | Logarithmic decrement ΔE at 120° C. of surface on aluminum alloy foil layer side of thermally-weldable resin layer | Thickness remaining ratio of thermally-weldable resin layer (%) Surface pressure 0.5 MPa | Seal strength (N/15 mm) | |
|---|---|---|---|---|
| | | | 25° C. environment | 140° C. environment |
| Example 1 | 0.15 | 82 | 125 | 4.2 |
| Example 33 | 0.26 | 73 | 130 | 3.2 |

From the results shown in Table 2, in the battery packaging materials of Examples 1 and 33, the logarithmic decrement ΔE at 120° C. in the rigid-body pendulum measurement of the surface of the heat-sealable resin layer on the aluminum alloy foil layer side is 0.50 or less, and it can be seen that crushing is effectively suppressed when the perature of the melting peak temperature of the heat-sealable resin layer after drying was measured from the obtained DSC curve.

In the measurement of the extrapolation melting onset temperature and the extrapolation melting termination temperature of the melting peak temperature, Q200 from TA Instruments Inc. was used as a differential scanning calorimeter. As for the DSC curve, the test sample was held at −50° C. for 10 minutes, and then heated to 200° C. at a temperature elevation rate of 10° C./min (first time) and held at 200° C. for 10 minutes, and then cooled to −50° C. at a temperature reduction rate of −10° C./min and held at −50° C. for 10 minutes, and then heated to 200° C. at a temperature elevation rate of 10° C./min (second time) and held at 200° C. for 10 minutes. As the DSC curve, a DSC curve obtained when the test sample was heated to 200° C. for the second time was adopted. Moreover, for the measurement of the temperature difference $T_1$ and the temperature difference $T_2$, the melting peak having the maximum difference in thermal energy input among melting peaks that appear in a range of 120 to 160° C. in each of the DSC curves was analyzed. Even when two or more overlapping peaks were present, only the melting peak having the maximum difference in thermal energy input was analyzed.

The extrapolation melting onset temperature referred to the onset point of the melting peak temperature, and was defined as the temperature at the intersection point between the straight line formed by extending the lower temperature (65 to 75° C.)-side baseline to the higher temperature side, and the tangent drawn at the point having the maximum gradient to the lower temperature-side curve of the melting peak having the maximum difference in thermal energy input. The extrapolation melting termination temperature referred to the termination point of the melting peak temperature, and was defined as the temperature at the intersection point between the straight line formed by extending the higher temperature (170° C.)-side baseline to the lower temperature side, and the tangent drawn at the point having the maximum gradient to the higher temperature-side curve of the melting peak having the maximum difference in thermal energy input.

<Measurement of Seal Strength Before Contact with Electrolyte>

The tensile strength (seal strength) was measured in the same manner as a manner <Measurement of seal strength after contact with electrolyte> described below except that the electrolyte was not injected into the test sample. A maximum tensile strength until the thermally-welded portion is completely peeled is defined as the seal strength before the contact with the electrolyte. In Table 3, the seal strength before the contact with the electrolyte is shown as the seal strength at a contact time of 0 h with the electrolyte at 85° C.

<Measurement of Seal Strength after Contact with Electrolyte>

As shown in the schematic diagram of FIG. 12, each of the battery packaging materials of Examples 1 and 33 obtained above was cut into a rectangle having a width (x direction) of 100 mm×a length (z direction) of 200 mm to prepare a test sample (battery packaging material 10) (FIG. 12a). The test sample (battery packaging material 10) was folded back at the center P in the z direction so that the heat-sealable resin layer side overlapped (FIG. 12b). Next, both ends in the x direction of the folded-back test sample were sealed by heat sealing (temperature: 190° C., surface pressure: 2.0 MPa, time: 3 seconds) to form a bag shape having one opening E (FIG. 12c). Next, from the opening E of the test sample formed into a bag shape, 6 g of the electrolyte (the solution in which the concentration of lithium hexafluorophosphate was 1 mol/l and the volume ratio of ethylene carbonate, diethyl carbonate and dimethyl carbonate was 1:1:1) was injected (FIG. 12d), and the end of the opening E was sealed by heat sealing (temperature: 190° C., surface pressure: 2.0 MPa, time: 3 seconds) (FIG. 12e). Next, with the folded-back portion of the bag-shaped test sample facing downward, the test sample was allowed to stand in the environment of a temperature of 85° C. for a predetermined storage time (the time of contact with the electrolyte, 0 hour, 24 hours, and 72 hours). Next, an end opposite to a folded piece of the test sample was cut (FIG. 12e), and the electrolyte was completely discharged. Next, in the state in which the electrolyte was attached to the surface of the heat-sealable resin layer, upper and lower surfaces of the test sample were sandwiched between the metal plates 20 (7 mm width) at the inner position in the Z direction by about 10 mm away from the fold P, and the heat-sealable resin layers were thermally welded to each other under conditions of a temperature of 190° C., a surface pressure of 1.0 MPa, and a time of 3 seconds (FIG. 12f). Next, the test sample was cut into a width of 15 mm with a double-edged sample cutter so that the seal strength at a width (x direction) of 15 mm could be measured (FIGS. 12f and 12g). Next, in the form of T-peel, using a tensile tester (AGS-Xplus (trade name) from Shimadzu Corporation), in the environment of a temperature of 25° C., the thermally-welded interface was peeled under the conditions of a tensile speed of 300 mm/min, a peeling angle of 180°, and an inter-chuck distance of 50 mm to measure the tensile strength (seal strength) (FIG. 11). The maximum tensile strength until the thermally-welded portion was completely peeled (the distance to peel was 7 mm, which was the width of the metal plate) was defined as the seal strength after the contact with the electrolyte.

Table 3 shows the retention (%) of the seal strength after the contact with the electrolyte, calculated using, as the reference (100%), the seal strength before the contact with the electrolyte.

TABLE 3

| | Contact with electrolyte at 85° C. | Onset point (° C.) | Termination point (° C.) | Temperature difference between onset point and termination point (° C.) | Ratio $T_2/T_1$ | Absolute value of difference $|T_2 - T_1|$ |
|---|---|---|---|---|---|---|
| Example 1 | Before | 126.3 | 161.0 | $T_1 = 34.7$ | 0.79 | 7.2 |
| | After | 128.1 | 155.6 | $T_2 = 27.5$ | | |
| Example 33 | Before | 126.9 | 157.5 | $T_1 = 30.6$ | 0.59 | 12.6 |
| | After | 131.4 | 149.4 | $T_2 = 18.0$ | | |

TABLE 4

|  |  | Contact time with electrolyte at 85° C. | | |
|---|---|---|---|---|
|  |  | 0 h | 24 h | 72 h |
| Example 1 | Seal strength (N/15 mm) | 140 | 140 | 140 |
|  | Retention (%) | 100 | 100 | 100 |
| Example 33 | Seal strength (N/15 mm) | 132 | 107 | 82 |
|  | Retention (%) | 100 | 81 | 62 |

The results shown in Tables 3 and 4 show that in each of the battery packaging materials of Examples 1 and 33, the value obtained by dividing the temperature difference $T_2$ by the temperature difference $T_1$ is 0.55 or more, and that high seal strength is achieved by means of thermal welding even when the electrolyte is in contact with the heat-sealable resin layer in a high-temperature environment and the heat-sealable resin layers with the electrolyte being attached thereto are thermally welded to each other. Furthermore, it can be seen that in the battery packaging material of Example 1, the value obtained by dividing the temperature difference $T_2$ by the temperature difference $T_1$ is 0.60 or more, and that higher seal strength is achieved by means of thermal welding even when the electrolyte is in contact with the heat-sealable resin layer in a high-temperature environment and the heat-sealable resin layers with the electrolyte being attached thereto are thermally welded to each other.

DESCRIPTION OF REFERENCE SIGNS

1 Polyester film layer
2 Adhesive agent layer
3 Aluminum alloy foil layer
4 heat-sealable resin layer
4a Interface portion between heat-sealable resin layers
5 Adhesive layer
6 Surface coating layer
10 Battery packaging material
11 Metal terminal
12 Adhesive film
30 Pendulum
30a Cylindrical edge
31 Cooling/heating block
32 Vibration displacement detector
33 Weight

The invention claimed is:

1. A battery packaging material comprising a laminate in which, at least, a polyester film layer, an aluminum alloy foil layer, and a heat-sealable resin layer are laminated in this order,
   wherein a thickness of the polyester film layer is 23 μm or more and 27 μm or less,
   a thickness of the aluminum alloy foil layer is 27 μm or more and 43 μm or less,
   a thickness of the heat-sealable resin layer is 70 μm or more and 100 μm or less, and
   a dielectric breakdown voltage of a surface on a side of the polyester film layer is 13 kV or more, and
   wherein a logarithmic decrement ΔE at 80° C. in rigid-body pendulum measurement of a surface on a side of the heat-sealable resin layer of the laminate is 0.04 or more.

2. The battery packaging material according to claim 1, wherein the polyester film layer comprises a stretched polyethylene terephthalate film.

3. The battery packaging material according to claim 1, wherein the heat-sealable resin layer comprises a random polypropylene film.

4. The battery packaging material according to claim 1, wherein the aluminum alloy foil layer comprises an aluminum alloy having a composition defined in JIS H4160:1994 A8021H-O.

5. The battery packaging material according to claim 1, wherein the battery packaging material is used for a vehicle battery.

6. A battery comprising a battery element comprising at least a positive electrode, a negative electrode, and an electrolyte, the battery element being stored in a package comprising the battery packaging material according to claim 1.

7. A battery comprising:
   a battery element comprising at least a positive electrode, a negative electrode, and an electrolyte;
   a package for sealing the battery element; and
   a metal terminal electrically connected to each of the positive electrode and the negative electrode and protruding to the outside of the package,
   wherein the package comprises the battery packaging material according to claim 1, and
   an adhesive film is present between the metal terminal and the package.

8. The battery according to claim 7, wherein a thickness of the metal terminal is 100 μm or more.

9. The battery according to claim 7, wherein a thickness of the adhesive film is 70 μm or more.

10. A method for manufacturing the battery packaging material according to claim 1, comprising a step of laminating at least, the polyester film layer, the aluminum alloy foil layer, and the heat-sealable resin layer in this order to obtain the laminate.

11. A battery packaging material comprising a laminate in which, at least, a polyester film layer, an aluminum alloy foil layer, and a heat-sealable resin layer are laminated in this order,
   wherein a thickness of the polyester film layer is 23 μm or more and 27 μm or less,
   a thickness of the aluminum alloy foil layer is 27 μm or more and 43 μm or less,
   a thickness of the heat-sealable resin layer is 70 μm or more and 100 μm or less,
   a dielectric breakdown voltage of a surface on a side of the polyester film layer is 13 kV or more; and
   wherein a temperature difference $T_1$ and a temperature difference $T_2$ are measured by the following method, and a value obtained by dividing the temperature difference $T_2$ by the temperature difference $T_1$ is 0.55 or more:
   (measurement of temperature difference $T_1$)
   the temperature difference $T_1$ between an extrapolation melting onset temperature and an extrapolation melting termination temperature of a melting peak temperature of the heat-sealable resin layer is measured by differential scanning calorimetry; and
   (measurement of temperature difference $T_2$)
   the heat-sealable resin layer is allowed to stand for 72 hours in an electrolyte which is a solution in which a concentration of lithium hexafluorophosphate is 1 mol/l and a volume ratio of ethylene carbonate, diethyl carbonate and dimethyl carbonate is 1:1:1, and then the heat-sealable resin is dried in an environment of a temperature of 85° C.; and the temperature difference $T_2$ between the extrapolation melting onset temperature and the extrapolation melting termination temperature of the melting peak temperature of the heat-sealable resin layer after drying is measured by differential scanning calorimetry.

12. A battery comprising a battery element comprising at least a positive electrode, a negative electrode, and an electrolyte, the battery element being stored in a package comprising the battery packaging material according to claim 11.

13. A battery comprising:
a battery element comprising at least a positive electrode, a negative electrode, and an electrolyte;
a package for sealing the battery element; and
a metal terminal electrically connected to each of the positive electrode and the negative electrode and protruding to the outside of the package,
wherein the package comprises the battery packaging material according to claim 11, and
an adhesive film is present between the metal terminal and the package.

14. A method for manufacturing the battery packaging material according to claim 11, comprising a step of laminating at least, the polyester film layer, the aluminum alloy foil layer, and the heat-sealable resin layer in this order to obtain the laminate.

15. A battery packaging material comprising a laminate in which, at least, a polyester film layer, an aluminum alloy foil layer, and a heat-sealable resin layer are laminated in this order,
wherein a thickness of the polyester film layer is 23 μm or more and 27 μm or less,
a thickness of the aluminum alloy foil layer is 27 μm or more and 43 μm or less,
a thickness of the heat-sealable resin layer is 70 μm or more and 100 μm or less,
a dielectric breakdown voltage of a surface on a side of the polyester film layer is 13 kV or more; and
wherein a logarithmic decrement ΔE at 120° C. in the rigid-body pendulum measurement of a surface of the heat-sealable resin layer on a side of the aluminum alloy foil layer is 0.50 or less.

16. A battery comprising a battery element comprising at least a positive electrode, a negative electrode, and an electrolyte, the battery element being stored in a package comprising the battery packaging material according to claim 15.

17. A battery comprising:
a battery element comprising at least a positive electrode, a negative electrode, and an electrolyte;
a package for sealing the battery element; and
a metal terminal electrically connected to each of the positive electrode and the negative electrode and protruding to the outside of the package,
wherein the package comprises the battery packaging material according to claim 15, and
an adhesive film is present between the metal terminal and the package.

18. A method for manufacturing the battery packaging material according to claim 15, comprising a step of laminating at least, the polyester film layer, the aluminum alloy foil layer, and the heat-sealable resin layer in this order to obtain the laminate.

* * * * *